(12) United States Patent
Hiller

(10) Patent No.: US 12,106,559 B2
(45) Date of Patent: Oct. 1, 2024

(54) HYBRID DRONE ENABLED COMMUNICATIONS SYSTEM FOR UNDERWATER PLATFORMS

(71) Applicant: The Boeing Company, Chicago, IL (US)

(72) Inventor: Nathan D. Hiller, Irvine, CA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 17/644,288

(22) Filed: Dec. 14, 2021

(65) Prior Publication Data

US 2022/0215657 A1 Jul. 7, 2022

Related U.S. Application Data

(60) Provisional application No. 63/133,655, filed on Jan. 4, 2021.

(51) Int. Cl.
*G06V 20/17* (2022.01)
*B64C 39/02* (2023.01)
(Continued)

(52) U.S. Cl.
CPC ............ *G06V 20/17* (2022.01); *B64C 39/024* (2013.01); *B64U 2101/20* (2023.01); *B64U 2101/30* (2023.01)

(58) Field of Classification Search
CPC .. G06V 20/17; B64C 39/024; B64U 2101/20; B64U 2101/30; B64U 10/14; B64U 80/84; B63G 8/38

(Continued)

(56) References Cited

U.S. PATENT DOCUMENTS

| 8,203,495 B2 | 6/2012 | Tonn |
| 10,315,762 B2 | 6/2019 | Diez-Garias et al. |

(Continued)

FOREIGN PATENT DOCUMENTS

| EP | 3251954 A1 | 12/2017 | |
| EP | 3617641 | * 3/2020 | ........... G05D 1/0206 |

(Continued)

OTHER PUBLICATIONS

Aerospace Daily & Defense Report, Aviation Week Intelligence Network, Nov. 24, 2020, 2 pages.

*Primary Examiner* — Jerome Grant, II
(74) *Attorney, Agent, or Firm* — Yee & Associates, P.C.

(57) ABSTRACT

A method, apparatus, and method for facilitating communications with an underwater platform. A communications system comprises an unmanned aerial vehicle, a radio frequency communications system, a laser communications system, and a controller. The unmanned aerial vehicle comprises a first section and a second section. The first section is moveably connected to the second section. The radio frequency communications system is connected to the first section of the unmanned aerial vehicle. The radio frequency communications system comprises a first parabolic antenna. The laser communications system is connected to the second section of the unmanned aerial vehicle. The laser communications system comprises a second parabolic antenna. The controller is configured to control the laser communications system to transmit incoming information in a transmit laser beam to the underwater platform submerged in a body of water. The incoming information is from a receive radio frequency signal received by the radio frequency communications system.

31 Claims, 14 Drawing Sheets

(51) Int. Cl.
  *B64U 101/20* (2023.01)
  *B64U 101/30* (2023.01)
(58) Field of Classification Search
  USPC .......................................................... 382/103
  See application file for complete search history.

(56) References Cited

U.S. PATENT DOCUMENTS

| | | | |
|---|---|---|---|
| 10,742,329 B2 | 8/2020 | Hiller | |
| 2006/0184456 A1* | 8/2006 | de Janasz | G06Q 20/403 |
| | | | 705/72 |
| 2007/0183783 A1 | 8/2007 | Lam | |
| 2016/0016649 A1* | 1/2016 | Jewell | B63G 8/08 |
| | | | 114/337 |
| 2016/0127042 A1 | 5/2016 | Farr et al. | |
| 2019/0146501 A1 | 5/2019 | Schick et al. | |
| 2019/0379138 A1* | 12/2019 | Bachmann | H01Q 21/24 |
| 2020/0158822 A1* | 5/2020 | Owens | H01Q 1/526 |

FOREIGN PATENT DOCUMENTS

| | | | | |
|---|---|---|---|---|
| JP | 4435932 B2 | 3/2010 | | |
| JP | WO2020044411 | * | 8/2021 | ............ G01S 17/74 |

* cited by examiner

HYBRID DRONE ENABLED COMMUNICATIONS SYSTEM FOR UNDERWATER PLATFORMS

RELATED PROVISIONAL APPLICATION

This application is related to and claims the benefit of priority of provisional U.S. Patent Application Ser. No. 63/133,655, entitled "HYBRID DRONE ENABLED COMMUNICATIONS SYSTEM FOR UNDERWATER PLATFORMS", filed on Jan. 4, 2021, which is hereby incorporated by reference.

BACKGROUND INFORMATION

1. Field

The present disclosure relates generally to a communications system and, in particular, to a method, apparatus, and system for communicating with an underwater platform.

2. Background

Communications on a global level between ground stations, aircraft, ships, land vehicles, and other platforms can occur using satellites. Satellites can relay and amplify radio frequency signals. Satellites can create communication channels between transmitters and receivers at different locations on the Earth. Satellites relay information over these communication channels using radio frequency signals using frequencies from 30 MHz to 10 GHz.

Satellite communications are generally unavailable to submerged underwater vehicles. Water blocks the radio frequency signals used by satellites. Currently, existing systems for communications involve having an underwater vehicle surface and raise an antenna or deploy a floating wire antenna while submerged. Having the underwater vehicle surface reduces efficiency in the speed of travel and increases the vulnerability of the underwater vehicle. A floating wire antenna is bulky and inefficient.

Therefore, it would be desirable to have a method and apparatus that take into account at least some of the issues discussed above, as well as other possible issues. For example, it would be desirable to have a method and apparatus that overcome a technical problem with communicating with a submerged underwater platform.

SUMMARY

An embodiment of the present disclosure provides a communications system for an underwater platform. The communications system comprises an unmanned aerial vehicle, a radio frequency communications system, a laser communications system, and a controller. The unmanned aerial vehicle comprises a first section and a second section. The first section is moveably connected to the second section. The radio frequency communications system is connected to the first section of the unmanned aerial vehicle. The radio frequency communications system includes a first parabolic antenna. The laser communications system is connected to the second section of the unmanned aerial vehicle. The laser communications system includes a second parabolic antenna. The controller is configured to control the laser communications system to transmit incoming information in a transmit laser beam to the underwater platform submerged in a body of water. The incoming information is from a receive radio frequency signal received by the radio frequency communications system.

Another embodiment of the present disclosure provides a communications system for an underwater platform. The communications system comprises an unmanned aerial vehicle, a radio frequency communications system, a laser communications system, and a controller. The unmanned aerial vehicle comprises a first section having a dish shape and a second section having the dish shape. The first section is moveably connected to the second section. The unmanned aerial vehicle is configured for an underwater movement and an aerial flight. The radio frequency communications system is connected to the first section of the unmanned aerial vehicle. The radio frequency communications system comprises a first parabolic antenna with a first parabolic antenna integrated as part of the dish shape in the first section. The laser communications system is connected to the second section of the unmanned aerial vehicle. The laser communications system comprises a second parabolic antenna with a second parabolic antenna integrated as part of the dish shape in the second section. The controller is located in the unmanned aerial vehicle and is configured to control the laser communications system to transmit incoming information in a transmit laser beam to the underwater platform submerged in a body of water. The incoming information is from a receive radio frequency signal received by the radio frequency communications system. The controller is configured to control the radio frequency communications system to transmit outgoing information in a transmit radio frequency signal. The outgoing information is from a receive laser beam received by the laser communications system.

Still another embodiment of the present disclosure provides a method for facilitating communications with an underwater platform. Incoming information in a receive radio frequency signal is received at parabolic antenna connected to a first section of an unmanned aerial vehicle. The incoming information is transmitted in a transmit laser beam from a second section of the unmanned aerial vehicle to the underwater platform submerged in a body of water. The second section is moveably connected to the first section.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
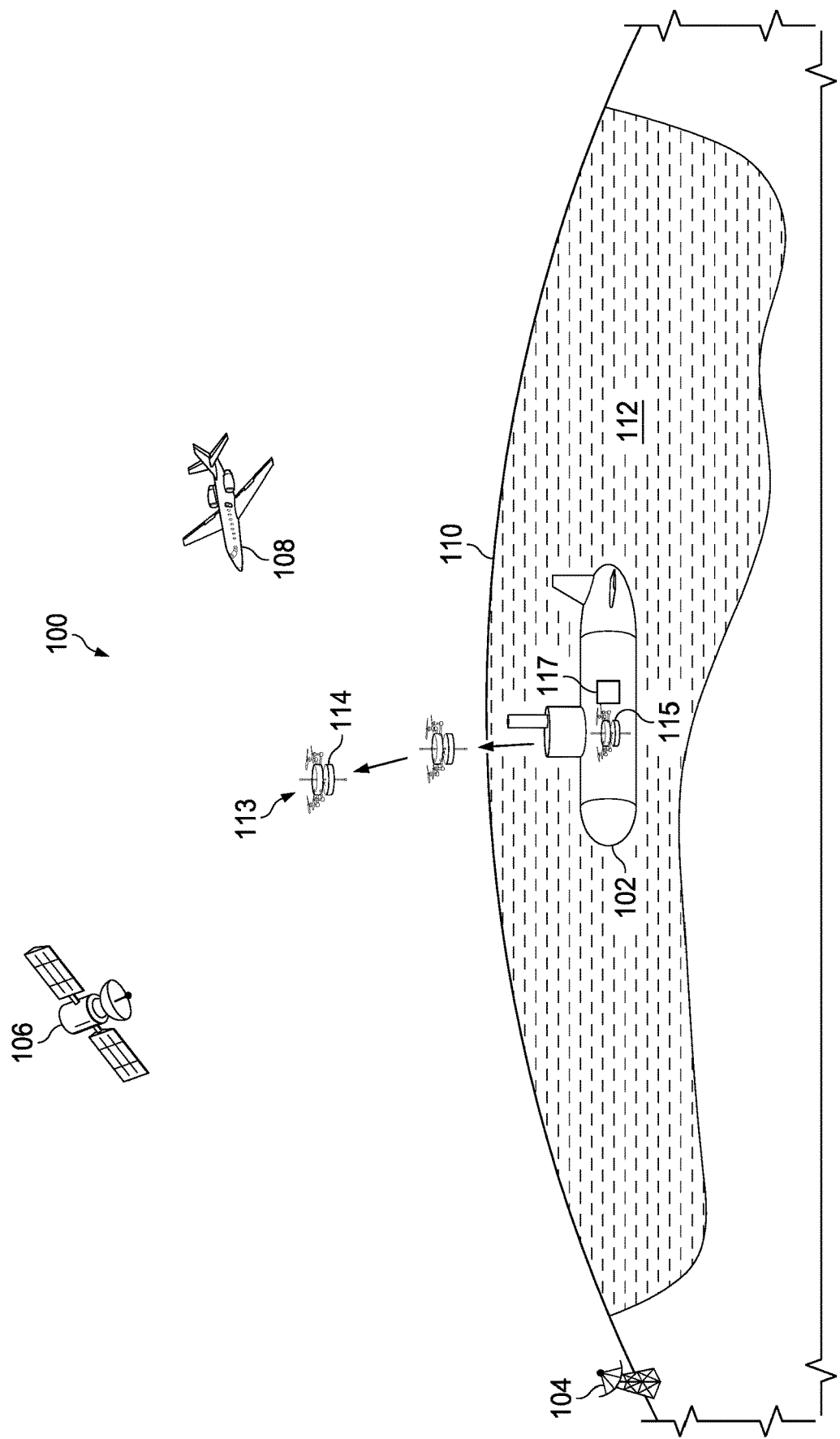
FIG. 1 is a pictorial illustration of a communications environment in accordance with an illustrative embodiment.

With reference now to the figures and, in particular, with reference to FIG. 1, a pictorial illustration of a communications environment is depicted in accordance with an illustrative embodiment. Communications environment 100 is an environment in which submerged submersible platforms, such that underwater platform 102 can communicate using radio frequency signals. In this illustrative example, underwater platform 102 is a submarine.

In this illustrative example, underwater platform 102 can communicate with ground station 104 via satellite 106 using radio frequency signals. Underwater platform 102 can also communicate with aircraft 108 using radio frequency signals. The communications can occur even when underwater platform 102 is submerged beneath surface 110 of body of water 112. In this example, body of water 112 is an ocean. In an illustrative example, the communications can be facilitated using communications system 113, which comprises unmanned aerial vehicle 114 deployed from underwater platform 102.

This deployment of unmanned aerial vehicle 114 can be performed while underwater platform 102 is submerged in body of water 112 or on surface 110 of body of water 112. In the depicted example, unmanned aerial vehicle 114 is configured for underwater movement and aerial flight. In this illustrative example, unmanned aerial vehicle 114 can be deployed from underwater platform 102, move upward through body of water 112 to surface 110, transition to aerial flight, and move into a position over underwater platform 102. In this illustrative example, unmanned aerial vehicle 114 is a hybrid drone that has both underwater and in air capabilities.

While located in underwater platform 102, unmanned aerial vehicle 114 can be connected to underwater platform 102. This connection can be used to facilitate the transfer of at least one data, power, or other signals. For example, first physical connector 115 for unmanned aerial vehicle 114 can be connected to second physical connector 117 in underwater platform 102. When first physical connector is connected to a second physical connector, stored information in underwater platform 102 can be transferred from unmanned aerial vehicle 114 to underwater platform 102.

Figure 2:
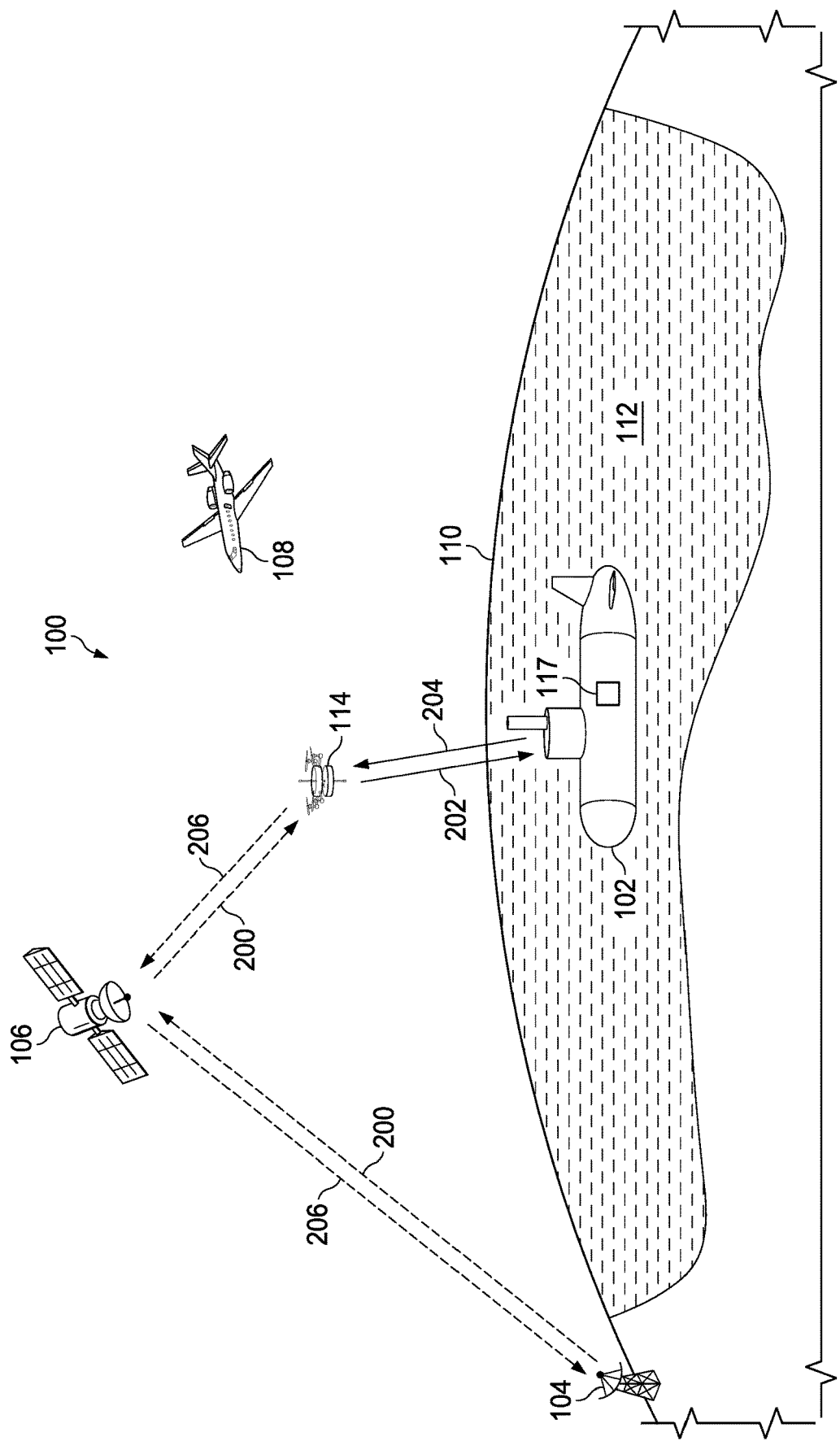
FIG. 2 is a pictorial illustration of a communications environment in which an unmanned aerial vehicle facilitates information exchange for a submarine in accordance with an illustrative embodiment.

With reference now to FIG. 2, a pictorial illustration of a communications environment in which an unmanned aerial vehicle facilitates information exchange for a submarine is depicted in accordance with an illustrative embodiment. In the illustrative examples, the same reference numeral may be used in more than one figure. This reuse of a reference numeral in different figures represents the same element in the different figures.

In this illustrative example, unmanned aerial vehicle 114 can operate to receive incoming information in receive radio frequency signal 200 from satellite 106. As depicted, receive radio frequency signal 200 originates from ground station 104 with satellite 106 relaying receive radio frequency signal 200 to unmanned aerial vehicle 114.

As depicted, unmanned aerial vehicle 114 can place incoming information obtained from receive radio frequency signal 200 into transmit laser beam 202. For example, transmit laser beam 202 can have a wavelength of 520 nm to travel with reduced attenuation in seawater.

In this example, unmanned aerial vehicle 114 can transmit the incoming information in transmit laser beam 202 to underwater platform 102 submerged in body of water 112. As a result, underwater platform 102 can receive the incoming information transmitted in receive radio frequency signal 200 while remaining submerged in body of water 112 using unmanned aerial vehicle 114.

In this illustrative example, unmanned aerial vehicle 114 is located directly over underwater platform 102. Being positioned directly over underwater platform 102 means that unmanned aerial vehicle 114 is positioned such that when transmit laser beam 202 is emitted downward, transmit laser beam 202 can be received by underwater platform 102. With this position, transmit laser beam 202 can be emitted in a downward direction that is substantially perpendicular to surface 110 of body of water 112 without unmanned aerial vehicle 114 needing to steer transmit laser beam 202 to reach underwater platform 102. In other illustrative examples, transmit laser beam 202 can be steered by unmanned aerial vehicle 114 to underwater platform 102 when unmanned aerial vehicle 114 is not located directly over underwater platform 102.

Further, underwater platform 102 can transmit outgoing information to ground station 104 via satellite 106 using unmanned aerial vehicle 114. As depicted, underwater platform 102 can emit receive laser beam 204 that is received by unmanned aerial vehicle 114. Unmanned aerial vehicle 114 can place the outgoing information into transmit radio frequency signal 206. Unmanned aerial vehicle 114 can transmit the outgoing information in transmit radio frequency signal 206.

In this example, transmit radio frequency signal 206 is directed at satellite 106. In turn, satellite 106 relays the outgoing information in transmit radio frequency signal 206 to the destination, ground station 104.

In this manner, a communications channel can be established between underwater platform 102 and ground station 104 using satellite 106 and unmanned aerial vehicle 114. The communications channel can be one directional or bidirectional depending on the implementation.

The use of unmanned aerial vehicle 114 enables underwater platform 102 to receive information transmitted in radio frequency signals while underwater platform 102 is submerged under body of water 112. Further, underwater platform 102 can transmit the outgoing information to another platform such as ground station 104 or aircraft 108 by sending the outgoing information in receive laser beam 204 to unmanned aerial vehicle 114. In turn, unmanned aerial vehicle 114 can place the outgoing information received in receive laser beam 204 into radio frequency signals that can be directed to at least one of ground station 104, aircraft 108, or some other suitable platform.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Consequently, the use of unmanned aerial vehicle 114 in facilitating communications for underwater platform 102 avoids a need for floating wire antennas that are bulky and inefficient. Additionally, the use of unmanned aerial vehicle 114 avoids underwater platform 102 needing to surface for radio frequency communications.

In an illustrative example, unmanned aerial vehicle 114 can return to underwater platform 102 when communications using radio frequency signals are no longer needed. Further, unmanned aerial vehicle 114 can return to underwater platform 102 to recharge or for maintenance.

The illustrations of communications environment 100 in FIG. 1 and FIG. 2 are not meant to imply physical or architectural limitations to the manner in which an illustrative embodiment can be implemented. Other components in addition to or in place of the ones illustrated may be used.

For example, FIGS. 1 and 2 illustrate underwater platform 102 as a submarine, but other types of underwater platforms can be used in addition to or in place of a submarine. For example, the underwater platform can be selected from a group comprising a mobile underwater platform, a stationary underwater platform, an underwater vehicle, an unmanned underwater vehicle, a remotely operated underwater vehicle, an autonomous underwater vehicle, a submarine, a submersible, an underwater habitat, an underwater laboratory, and other suitable types of underwater platforms.

As another example, underwater platform 102 can communicate with other platforms in addition to or in place of ground station 104 and aircraft 108. For example, underwater platform 102 can communicate with at least one of a space station, a surface ship, a ground vehicle, a train, an office complex, or some other mobile or stationary platform that communicates using radio frequency signals.

Further, although unmanned aerial vehicle 114 is depicted as being deployed while underwater platform 102 is submerged, unmanned aerial vehicle 114 can also be deployed while underwater platform 102 is on surface 110 of body of water 112. As a result, the deployment of unmanned aerial vehicle 114 can be performed while underwater platform 102 is at least one of submerged in body of water 112 or on surface 110 of body of water 112. In a similar fashion, the retrieval of unmanned aerial vehicle 114 can also be performed while underwater platform 102 is at least one of submerged in body of water 112 or on surface 110 of body of water 112.

Figure 3:
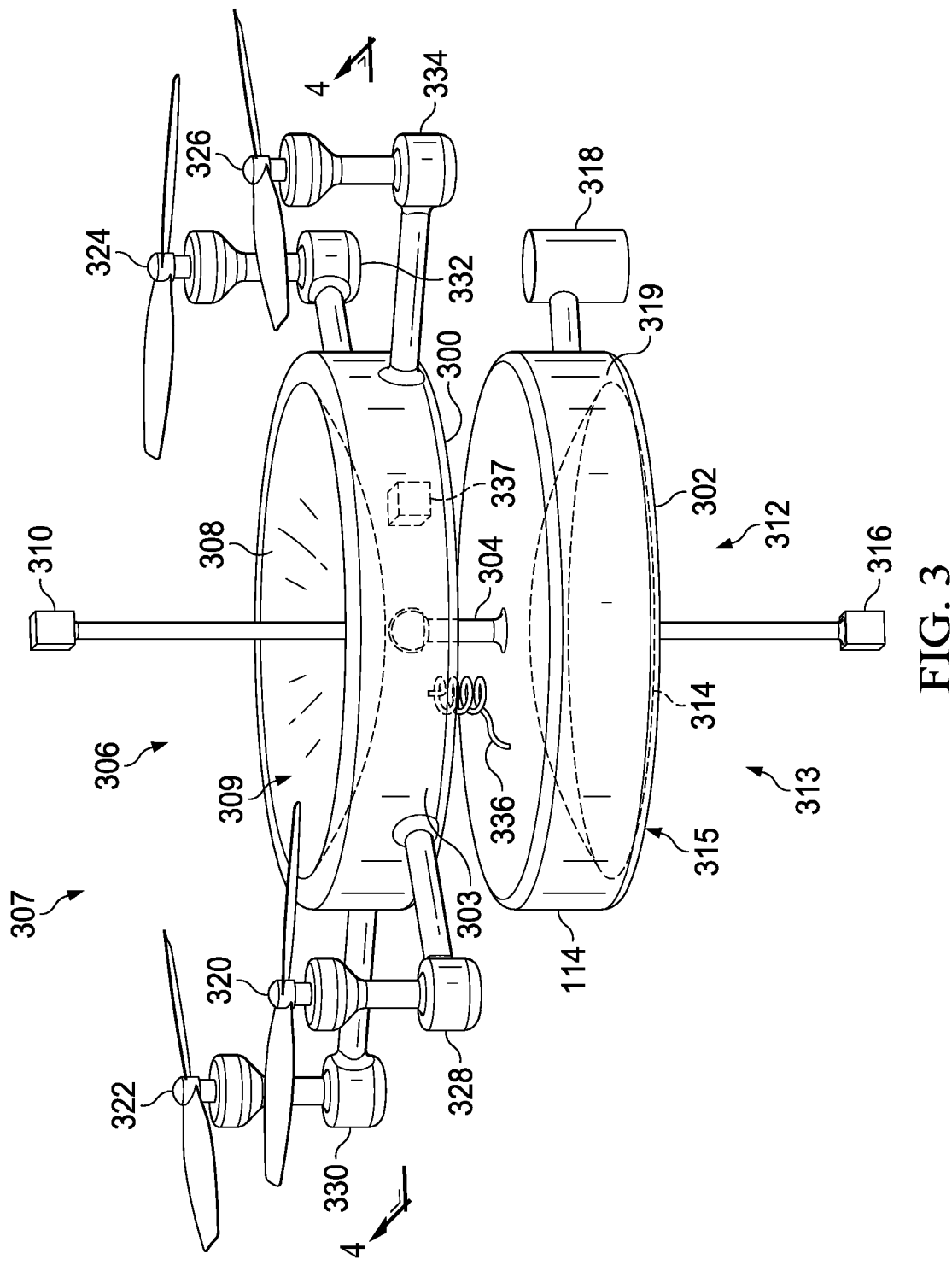
FIG. 3 is an illustration of an isometric view of an unmanned aerial vehicle in accordance with an illustrative embodiment.

With reference now to FIG. 3, an illustration of an isometric view of an unmanned aerial vehicle is depicted in accordance with an illustrative embodiment. This figure provides an enlarged view of unmanned aerial vehicle 114 shown in FIG. 1 and FIG. 2.

As depicted, unmanned aerial vehicle 114 comprises first section 300 and second section 302. First section 300 is movably connected to second section 302.

When one component is "connected" to another component, the connection is a physical association. For example, a first component, first section 300, can be considered to be physically connected to a second component, second section 302, by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

As depicted, first section 300 and second section 302 are movable relative to each other. In this illustrative example, second section 302 and first section 300 are connected such that second section 302 points downward while first section 300 can change orientations during aerial flight of unmanned aerial vehicle 114.

In this illustrative example, first section 300 and second section 302 are connected to each other by swivel joint 304. In this illustrative example, swivel joint 304 enables first section 300 and second section 302 to move relative to each other with six degrees of freedom. In an illustrative example, swivel joint 304 can have a dampening mechanism to reduce vibrations in second section 302. This dampening mechanism may be, for example, a high viscosity grease or lubricant which has a viscosity that reduces vibrations in second section 302.

First parabolic antenna 306 is part of radio frequency communications system 307 connected to first section 300 of unmanned aerial vehicle 114. First parabolic antenna 306 comprises first parabolic reflector 308 and first feed antenna 310. In this illustrative example, first parabolic reflector 308 is integrated into dish shape 309 of first section 300.

In this illustrative example, first parabolic reflector 308 is configured to focus radio frequency waves in receive radio frequency signal 200 in FIG. 2. First parabolic reflector 308 can be comprised of various material such as sheet-metal, a metal screen, a wire grill, or some other suitable material. Openings can be present in first parabolic reflector 308 and these openings can be selected to be smaller than one tenth of the wavelength in these illustrative examples.

The shape of first parabolic reflector 308 can be selected to be within a desired fraction of the wavelength of interest such that receive radio frequency signal 200 in FIG. 2 from different parts of first parabolic antenna 306 arrives at a focus point where first feed antenna 310 is located.

In an illustrative example, first feed antenna 310 can be a low gain feed antenna such as a one-half dipole. In other illustrative examples, first feed antenna 310 can be implemented using a horn.

As depicted, second parabolic antenna 312 is part of laser communications system 313 connected to second section 302 of unmanned aerial vehicle 114. As depicted, second parabolic antenna 312 comprises second parabolic reflector 314 and second feed antenna 316. As depicted, second parabolic reflector 314 is integrated into dish shape 315 of second section 302.

In this illustrative example, laser unit 318 is connected side 319 to second section 302 and is part of the laser communications system. Laser unit 318 is designed to emit transmit laser beam 202 in FIG. 2 from side 319 of second section 302.

In this depicted example, second parabolic reflector 314 is configured to focus coherent light in receive laser beam 204 in FIG. 2. Second parabolic reflector 314 can be, for example, a mirror reflector having the shape of a parabola. The shape of second parabolic reflector 314 can be selected such that the coherent light reflected by second parabolic reflector 314 has a focal point at second feed antenna 316. In this illustrative example, second feed antenna 316 can include an optical-electrical modulator that detects the coherent light in receive laser beam 204 in FIG. 2.

In this illustrative example, unmanned aerial vehicle 114 takes the form of a quadcopter having four rotors (rotor 320, rotor 322, rotor 324, and rotor 326) connected to first section 300. These rotors form a propulsion system for unmanned aerial vehicle 114. Each rotor comprises a motor and a propeller in this depicted example. The different rotors can operate at different speeds to adjust the orientation of first section 300.

Additionally, the rotors can also be connected to first section 300 using swivel joints. As depicted, rotor 320 is connected to first section 300 by swivel joint 328; rotor 322 is connected to first section 300 by swivel joint 330; rotor 324 is connected to first section 300 by swivel joint 332; and rotor 326 is connected to first section 300 by swivel joint 334. These swivel joints can be configured to enable the rotors to be positioned relative to first section 300 with six degrees of freedom.

Further, information processing components in first section 300 and second section 302 can communicate with each other using link 336. Link 336 can facilitate the transfer of at least one of electrical signals or optical signals. In this illustrative example, link 336 is comprised of at least one of an ethernet cable, an optical cable, an optical fiber, a universal serial bus cable, or some other suitable type of connector that enables the transmission of information between first section 300 and second section 302. The different components illustrated for unmanned aerial vehicle 114 in this figure can be powered by unmanned aerial vehicle power source 337.

Figure 4:
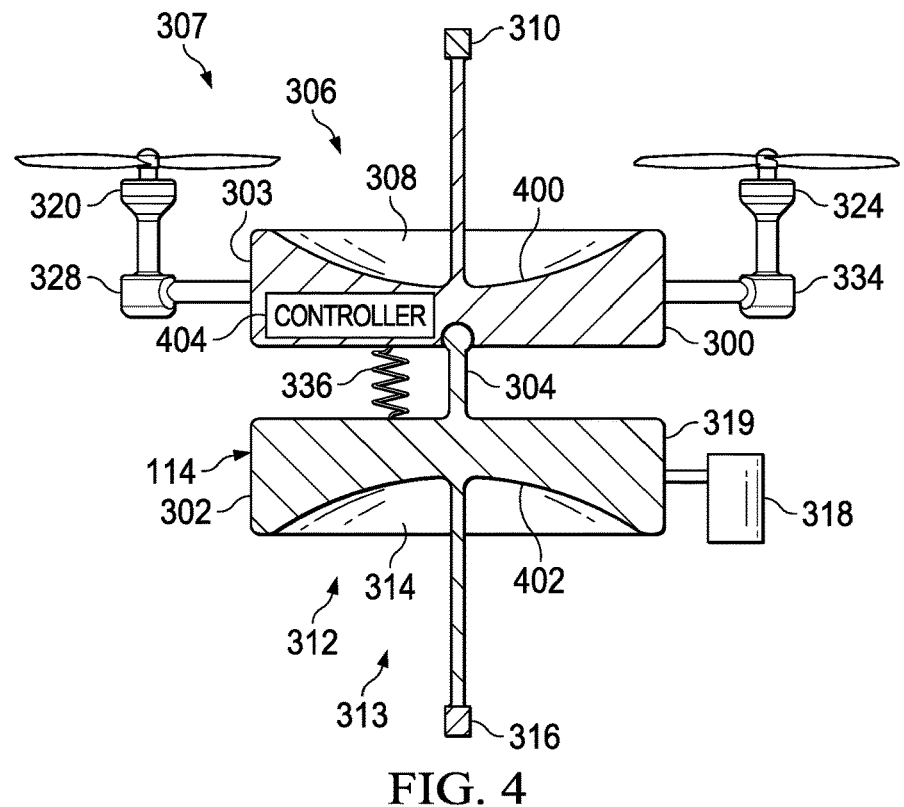
FIG. 4 is an illustration of a cross-sectional view of the unmanned aerial vehicle in FIG. 3 in accordance with an illustrative embodiment.

Turning now to FIG. 4, an illustration of a cross-sectional view of the unmanned aerial vehicle in FIG. 3 is depicted in accordance with an illustrative embodiment. As depicted, a cross-sectional view of unmanned aerial vehicle 114 is shown taken along lines 4-4 in FIG. 3.

As seen in this cross-sectional view, first section 300 has dish shape 309 and second section 302 has dish shape 315. In this example, these dish shapes describe the shapes of the sections. For example, dish shape 309 can be the shape of first surface 400 of first section 300 and dish shape 315 can be the shape of second surface 402 of second section 302. In another illustrative example, these dish shapes can describe the overall shape of at least one of first section 300 or second section 302.

The parameters for describing the curve for dish shape 309 and dish shape 315 can be different between first section 300 and second section 302. In other words, dish shape 309 for first section 300 and dish shape 315 for second section 302 do not necessarily have the same dimensions although they both have the "dish shape".

For example, first surface 400 and second surface 402 are defined by parabolas used in the parabolic reflectors that are connected to or integrated as part of first surface 400 and second surface 402. In this example, the parameters defining the shape of the parabolas can be the same or different between first surface 400 and second surface 402 depending on the implementation.

For example, the parabola for first surface 400 can have a shape based on providing a desired level of focusing of receive radio frequency signal 200 in FIG. 2 at first parabolic reflector 308. The parabola for second surface 402 can be based on a shape that is desired for focusing the coherent light in receive laser beam 204 in FIG. 2 at second feed antenna 316.

As depicted in this cross-sectional view, unmanned aerial vehicle 114 includes controller 404. In this example, controller 404 is located in first section 300. Controller 404 can be implemented in hardware, software, or both hardware and software. In other illustrative examples, controller 404 can be located in second section 302 or distributed between both first section 300 and second section 302.

In this depicted example, controller 404 is configured to control operation of unmanned aerial vehicle 114. The operations can include, for example, controlling flight of unmanned aerial vehicle 114 during aerial flight, controlling movement of unmanned aerial vehicle 114 in body of water 112 in FIGS. 1-2, receiving receive radio frequency signal 200 in FIG. 2, receiving receive laser beam 204 in FIG. 2, transmitting transmit radio frequency signal 206 in FIG. 2, transmitting transmit laser beam 202 in FIG. 2, or other suitable operations performed by unmanned aerial vehicle 114.

Figure 5:
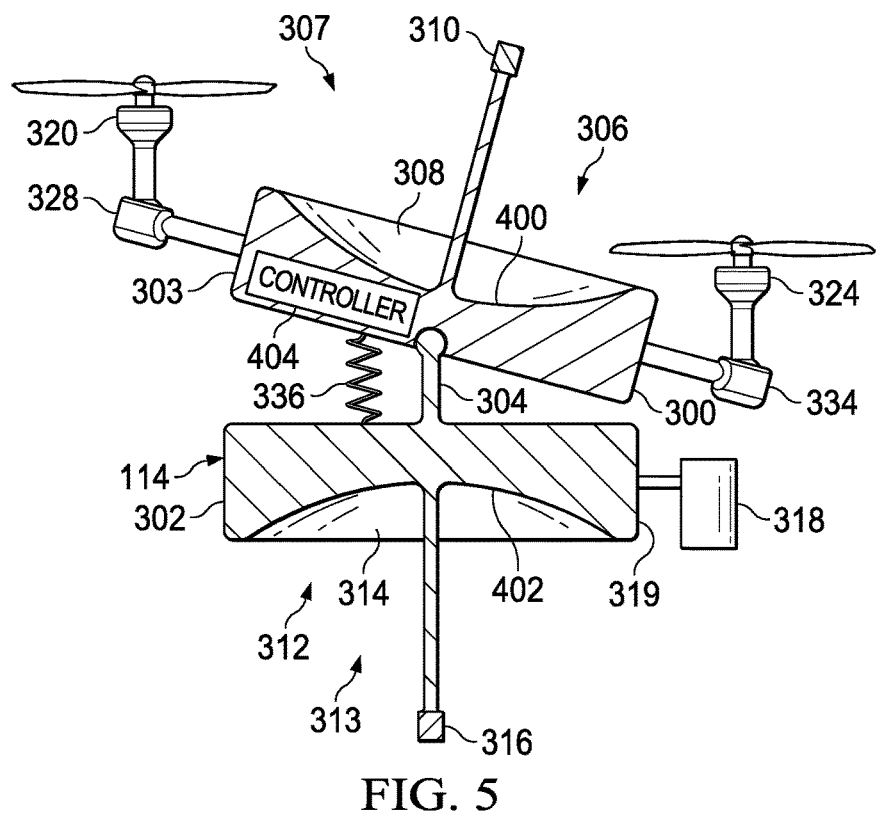
FIG. 5 is an illustration of a cross-sectional view of the unmanned aerial vehicle in FIG. 3 in accordance with an illustrative embodiment.

With reference next to FIG. 5, an illustration of a cross-sectional view of the unmanned aerial vehicle in FIG. 3 is depicted in accordance with an illustrative embodiment. As depicted, a cross-sectional view of unmanned aerial vehicle 114 is shown taken along lines 4-4 in FIG. 3.

In this view, first section 300 is tilted relative to second section 302. The orientation of first section 300 can be changed to point towards a source of receive radio frequency signal 200 in FIG. 2 or to direct transmit radio frequency signal 206 in FIG. 2 to a target.

The change in orientation of first section 300 can be controlled by the operation of the rotors. For example, the rotors can tilt using the swivel joints to control a change in the orientation of first section 300. In another example, the speed at which individual rotors operate can be selected to control the orientation of first section 300.

As depicted, second section 302 hangs from first section 300 with second parabolic antenna 312 pointing downward during an aerial flight of unmanned aerial vehicle 114. As shown, second section 302 is moveable relative to first section 300 such that second parabolic antenna 312 on second section 302 remains pointing downward even when first section 300 changes orientation. This positioning of second section 302 reduces a need to steer transmit laser beam 202 in FIG. 2 when unmanned aerial vehicle 114 is positioned directly over underwater platform 102 (e.g., as shown in FIGS. 1-2).

The illustrations of unmanned aerial vehicle 114 in FIGS. 3-5 are not meant to limit the manner in which other illustrative examples can be implemented. For example, unmanned aerial vehicle 114 can have other numbers of rotors other than four rotors as depicted in the figures. For example, unmanned aerial vehicle 114 can have three rotors, five rotors, eight rotors, or some other number of rotors.

As used herein, a "number of," when used with reference to items, means one or more items. For example, a "number of rotors" is one or more rotors.

In yet another illustrative example, the rotors can be located on at least one of first section 300 or second section 302. The rotors can be located on second section 302 if the orientation of first section 300 and second section 302 can be controlled by a mechanical mechanism other than using swivel joint 304.

Further, dimensions for first section 300 and second section 302 can be different. In other words, first section 300 can be wider or taller than second section 302 depending on the particular implementation. Further, parabolas shown in the cross-sectional views for first parabolic reflector 308 and second parabolic reflector 314 can have different dimensions from each other. For example, a hydraulic system can be used in addition to or in place of swivel joint 304 to control the orientation of first section 300 and second section 302 relative to each other.

Figure 6:
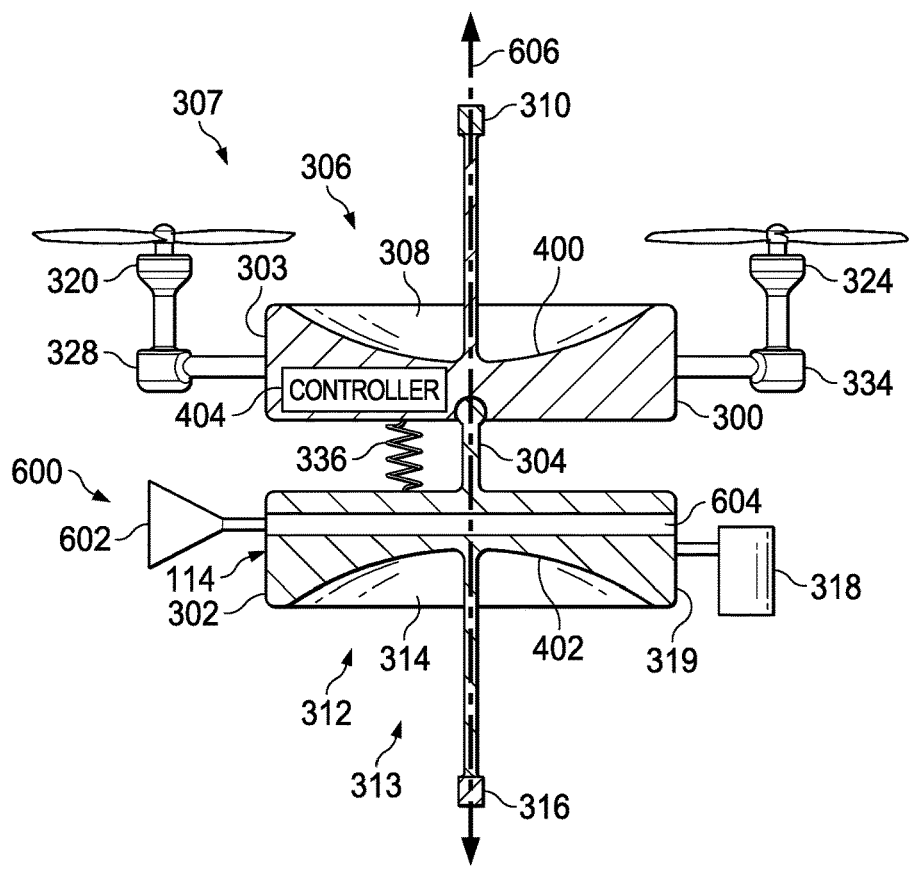
FIG. 6 is an illustration of a cross-sectional view of an unmanned aerial vehicle with a camera system in a second section in accordance with an illustrative embodiment.

In FIG. 6, an illustration of a cross-sectional view of an unmanned aerial vehicle with a camera system in a second section is depicted in accordance with an illustrative embodiment. As depicted, a cross-sectional view of unmanned aerial vehicle 114 is shown taken along lines 4-4 in FIG. 3 with the addition of camera system 600.

In this view, camera system 600 can be used with unmanned aerial vehicle 114 that can provide a periscope function. As depicted, camera system 600 comprises camera 602 and camera track 604. For example, camera 602 can generate images of the environment around unmanned aerial vehicle 114 and send those images to underwater platform 102 in FIGS. 1-2. These images can be sent in transmit laser beam 202 in FIG. 2. As a result, underwater platform 102 can remain submerged and may be submerged deeper than typically possible with a conventional periscope.

As depicted, camera track 604 can be configured in a number of different ways. For example, camera 602 can be rigidly connected to camera track 604. In this example, camera track 604 can be configured to move. In other words, camera track 604 can rotate in second section 302 about axis 606.

In another illustrative example, camera 602 is movably connected to camera track 604. In this example, camera track 604 does not move. Instead, camera 602 can move along camera track 604.

Figure 7:
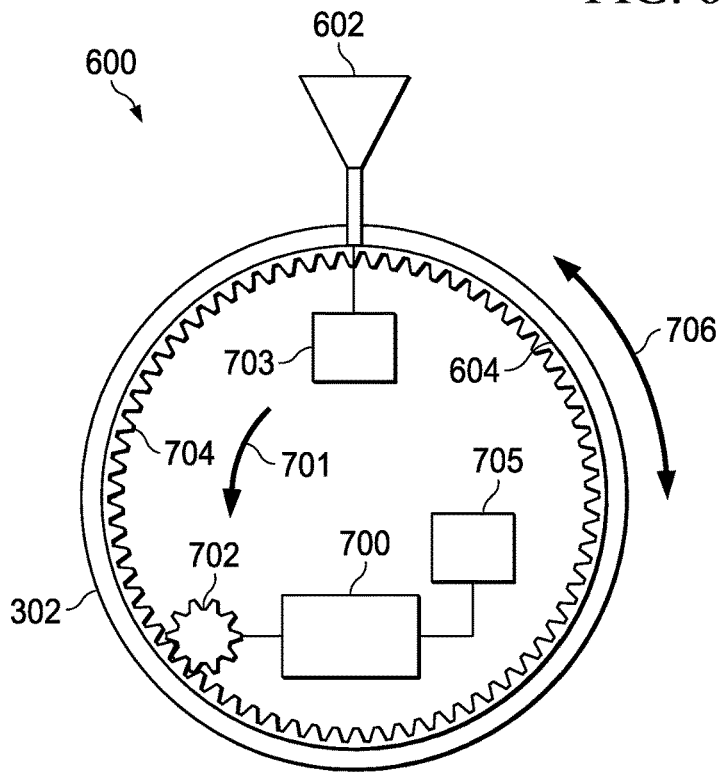
FIG. 7 is an illustration of a movement system in a camera system in accordance with an illustrative embodiment.

Turning to FIG. 7, an illustration of a movement system in a camera system is depicted in accordance with an illustrative embodiment. In this example, camera 602 is secured to camera track 604. Camera track 604 is movable with respect to first section 300.

As depicted, camera system 600 can include a movement system 701 comprising motor 700 and gear 702. In this illustrative example, gear 702 engages teeth 704 on camera track 604. With teeth 704, camera track 604 can be a gear that is part of a circular gear system including gear 702. As depicted, movement system 701 includes movement power source 705 that operates to provide power to motor 700. In this example, movement power source 705 can be separate from unmanned aerial vehicle power source 337 for unmanned aerial vehicle 114 and camera power source 703 for camera 602.

Motor 700 can rotate gear 702 causing camera track 604 with camera 602 to move. This movement can be in the direction of arrow 706. The movement can be a rotational movement in at least one of a clockwise or a counterclockwise direction.

Figure 8:
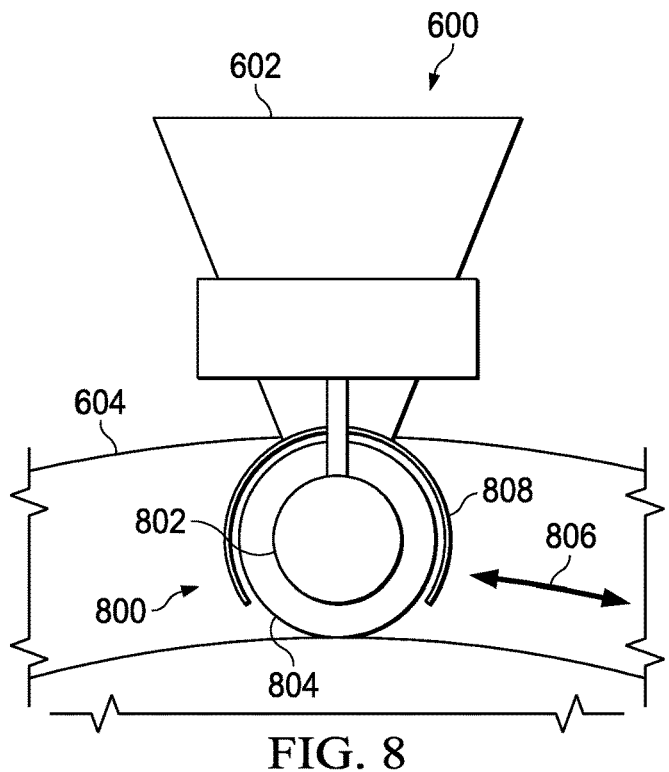
FIG. 8 is an illustration of a movement system in a camera system in accordance with an illustrative embodiment.

With reference to FIG. 8, an illustration of a movement system in a camera system is depicted in accordance with an illustrative embodiment. In this example, camera track 604 is not movable and camera 602 is movably connected to camera track 604.

As depicted in this example, camera system 600 can include a movement system in the form of motorized wheel 800 comprising motor 802 and wheel 804. Wheel 804 is moveable connected to camera track 604. For example, camera track 604 can include a channel in which wheel 804 is movably secured.

In this example, camera 602 is connected to wheel 804. Motor 802 is configured to rotate wheel 804 causing wheel 804 to move within camera track 604. This movement can move camera 602 along camera track 604 in the direction of arrow 806.

As depicted, wheel cover 808 is an example of another component that may be part of motorized wheel 800. Wheel cover 808 can keep debris away from wheel 804.

In another illustrative example, a non-motorized wheel or other movement system can be used. For example, a barrier can be used in this example.

With this implementation, camera track 604 can be located in first section 300 in FIGS. 3-6 of unmanned aerial vehicle 114. With this depicted example, the movement of wheel 804 in camera track 604 can occur when first section 300 tilts at an angle relative to a horizontal plane. Camera 602 on wheel 804 can move within camera track 604 to different positions based on gravity. As a result, camera 602 can move along camera track 604 based on mass seeking the lowest potential energy. In this example, after camera 602 reaches a desired position, first section 300 can return to a horizontal orientation. An amount of friction can be present that maintains camera 602 in the new position. Thus, the position of camera 602 can be controlled by at least one of rotating unmanned aerial vehicle 114 or tiling unmanned aerial vehicle 114 temporarily such that camera 602 slides within camera track 604 into the position due to gravity. The sliding caused by gravity can implemented using a nonmotorized wheel. Moreover, camera track 604 can be moveable about a circumference of a body of unmanned aerial vehicle 114 and prevents movement of the camera in a direction normal to a surface of the body. The body can be, for example, first section 300 or second section 302.

Figure 9:
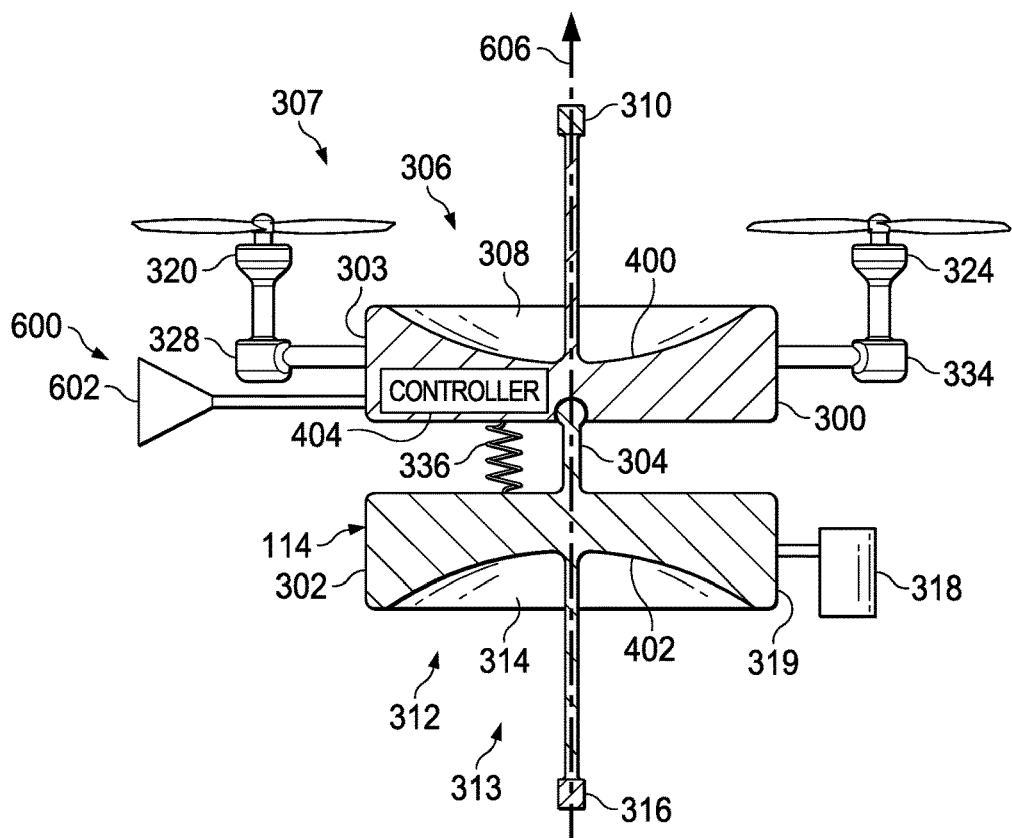
FIG. 9 is an illustration of a cross-sectional view of an unmanned aerial vehicle with a camera system in a first section in accordance with an illustrative embodiment.

Next, FIG. 9 is an illustration of a cross-sectional view of an unmanned aerial vehicle with a camera system in a first section depicted in accordance with an illustrative embodiment. As depicted, a cross-sectional view of unmanned aerial vehicle 114 is shown taken along lines 4-4 in FIG. 3 with the addition of camera system 600.

In this illustrative example, camera system 600 comprises camera 602 connected to first section 300. As depicted, camera 602 in camera system 600 is secured to first section 300.

Movement of camera 602 occurs through movement of first section 300. For example, camera 602 can rotate 360 degrees through rotation of first section 300 about axis 606. In this manner, camera 602 can generate images in a manner that allows level viewing for 360 degrees. Further, camera 602 can provide images for angle viewing through the ability of first section 300 to change orientation with six degrees of freedom.

Figure 10:
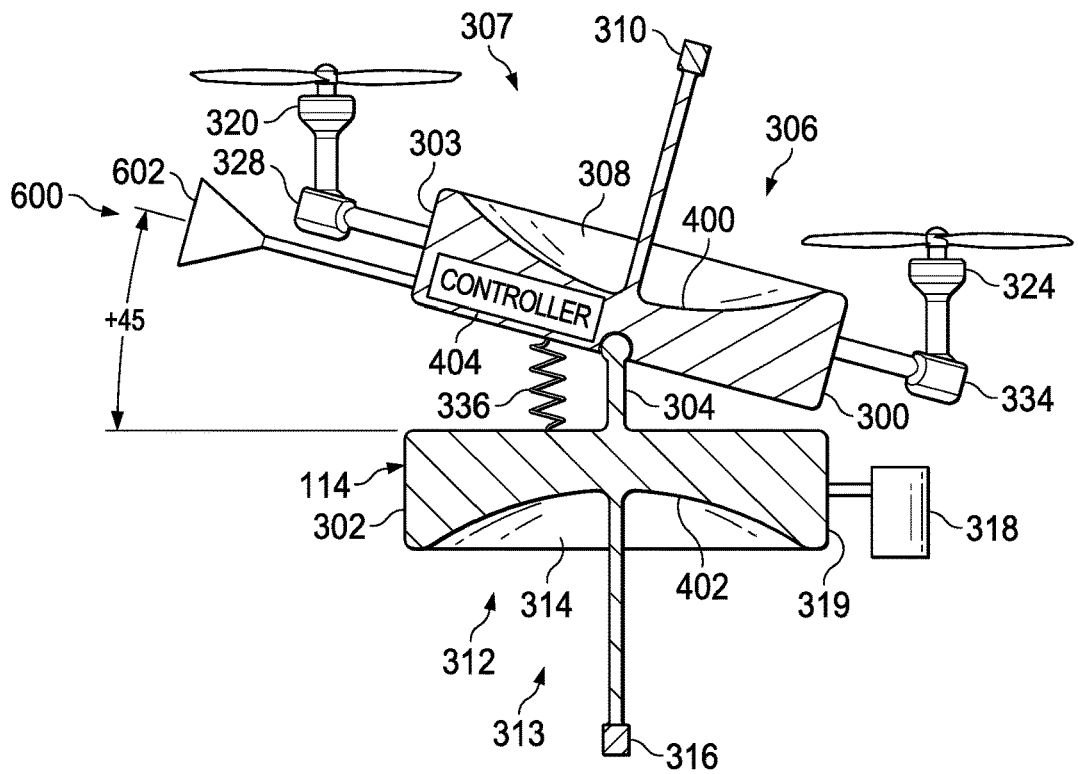
FIG. 10 is an illustration of a cross-sectional view of the unmanned aerial vehicle in FIG. 9 with the camera system having a +45 degree angle in accordance with an illustrative embodiment.

Turning now to FIG. 10, an illustration of a cross-sectional view of the unmanned aerial vehicle in FIG. 3 with a camera system in a first section having a +45 degree angle is depicted in accordance with an illustrative embodiment. In this figure, first section 300 is tilted such that the angle of camera 602 is +45 degrees.

Figure 11:
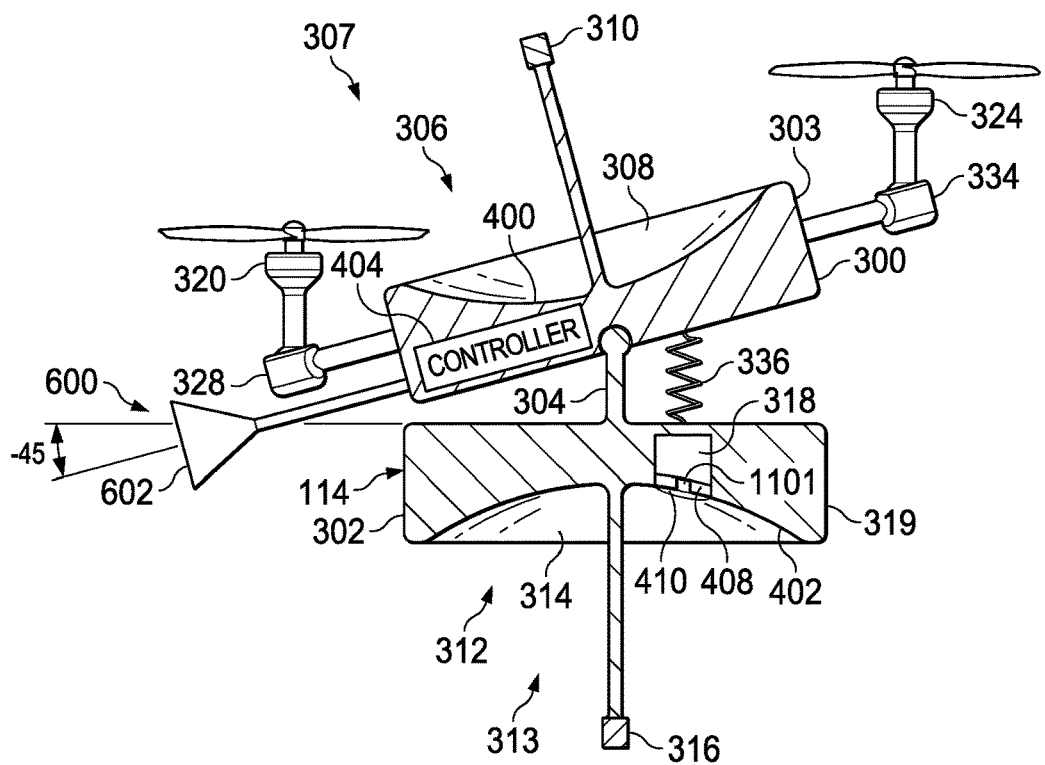
FIG. 11 is an illustration of a cross-sectional view of an unmanned aerial vehicle with a camera system in a first section having a −45 degree angle in accordance with an illustrative embodiment.

With reference next to FIG. 11, an illustration of a cross-sectional view of an unmanned aerial vehicle with the camera system in a first section having a −45 degree angle is depicted in accordance with an illustrative embodiment. In this view, first section 300 is a position such that the angle of camera 602 is −45 degrees.

Further, in this illustrative example, laser unit 318 is located in the interior of second section 302. With this interior location, opening 408 is present in second parabolic reflector 314 to enable the emission of transmit laser beam 202 (see FIG. 2) through opening 1101 in second parabolic antenna 312 from laser unit 318 located within second section 302. Optionally, transmission plate 410 can cover opening 408. In this illustrative example, transmission plate 410 is comprised of a material that passes transmit laser beam 202 while reducing the entry of at least one of debris or moisture into second section 302. For example, transmission plate 410 can be comprised of glass. Other materials, such as polycarbonate, can be used depending on the thickness of the material and the wavelength of transmit laser beam 202.

In yet another illustrative example, laser unit 318 can be connected to side 303 of first section 300. With this example, transmit laser beam 202 can be emitted from side 303 of first section 300.

Illustrations of the viewing angles in FIGS. 9-11 are provided as examples and not meant to limit the viewing angles that can be provided in other illustrative examples. For example, other viewing angles other than +/−45 degrees can be provided depending on the manner in which first section 300 is connected to second section 302. For example, increased viewing angles can be provided when swivel joint 304 has a greater length to provide additional distance between first section 300 and second section 302.

As a result, unmanned aerial vehicle 114 in the illustrative examples depicted in FIGS. 6-11 can provide views above the surface 110 of body of water 112 as a remote periscope deployed from underwater platform 102. In the illustrative examples, camera 602 in camera system 600 can be positioned by movement of unmanned aerial vehicle 114 as described in FIGS. 9-11 or with camera 602 being positioned using a camera track 604 without needing movement of unmanned aerial vehicle 114.

In the illustrative examples, camera track 604 and gear 702 can form a circular gear system that moves camera 602. In another illustrative example, camera track 604 is stationary with respect to second section 302. With this depicted example, camera 602 is connected to motorized wheel 800 which moves in camera track 604 to move camera 602 along camera track 604.

Illustrations of camera system 600 in FIGS. 6-11 are not meant to limit the manner in which other illustrative examples can be implemented. For example, camera system 600 can include one or more cameras in addition to or in place of camera 602. These cameras can be connected to camera track 604. In another illustrative example, the additional cameras in camera system 600 can be located on at least one of first section 300 or second section 302. As a result, cameras can be located on one or both sections of unmanned aerial vehicle 114.

Further, within the illustrative examples, camera system 600 can be included in any suitable unmanned aerial vehicle. Although camera system 600 is illustrated as included on unmanned aerial vehicle 114 having first section 300 and second section 302, in other examples, camera system 600 is included on other unmanned aerial vehicles. For instance, camera system 600 can be included on any hybrid drone that has both underwater and in air capabilities.

Figure 12:
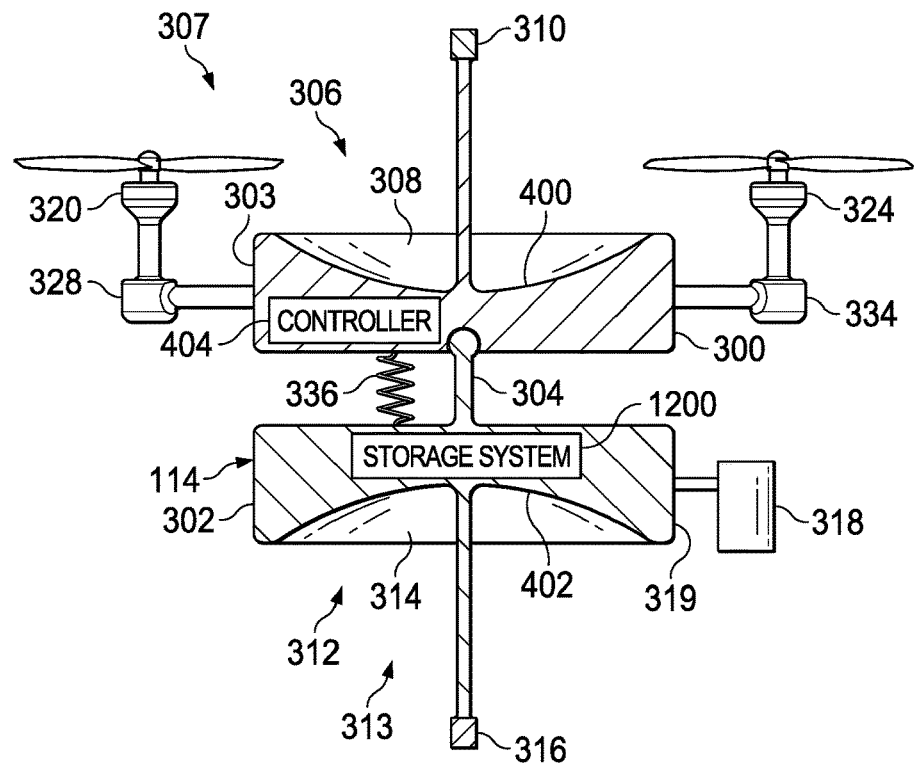
FIG. 12 is an illustration of a cross-sectional view of an unmanned aerial vehicle configured to physically transfer data in accordance with an illustrative embodiment.

Turning next to FIG. 12, an illustration of a cross-sectional view of an unmanned aerial vehicle configured to physically transfer data is depicted in accordance with an illustrative embodiment. As depicted, a cross-sectional view of unmanned aerial vehicle 114 is shown taken along lines 4-4 in FIG. 3. As depicted in this example, unmanned aerial vehicle 114 is configured to perform free space data transfer.

With this illustrative example of FIG. 12 and with further reference to FIG. 2, the depth of underwater platform 102 may be deeper than feasible to transmit incoming information received in receive radio frequency signal 200 in a desired manner because of attenuation of transmit laser beam 202. Controller 404 in unmanned aerial vehicle 114 can store the incoming information in storage system 1200 located in second section 302 of unmanned aerial vehicle 114.

As depicted, storage system 1200 is a hardware system that can include a set of storage devices. As used herein, a "set of," when used with reference to items, means one or more items. For example, a "set of storage devices" is one or more storage devices.

The set of storage devices in storage system 1200 can be, for example, a hard drive, a solid-state drive, an optical drive, or some other suitable storage device. Controller 404 in unmanned aerial vehicle 114 can store the incoming information in storage system 1200.

In this illustrative example, storage system 1200 can be configured to store the incoming information in storage system 1200 to form stored information. With the stored information in storage system 1200, unmanned aerial vehicle 114 can submerge and move in body of water 112 to a location closer to underwater platform 102. The closer location of unmanned aerial vehicle 114 can enable transmission of the stored information in transmit laser beam 202 such that underwater platform 102 can receive the stored information in transmit laser beam 202 with less attenuation as compared to when unmanned aerial vehicle 114 is in aerial flight above surface 110 of body of water 112. With this illustrative example, the depth of underwater platform 102 may be deeper than normally feasible to transmit information in transmit laser beam 202 in a desired manner because of attenuation of transmit laser beam 202 when traveling within body of water 112.

Figure 13:
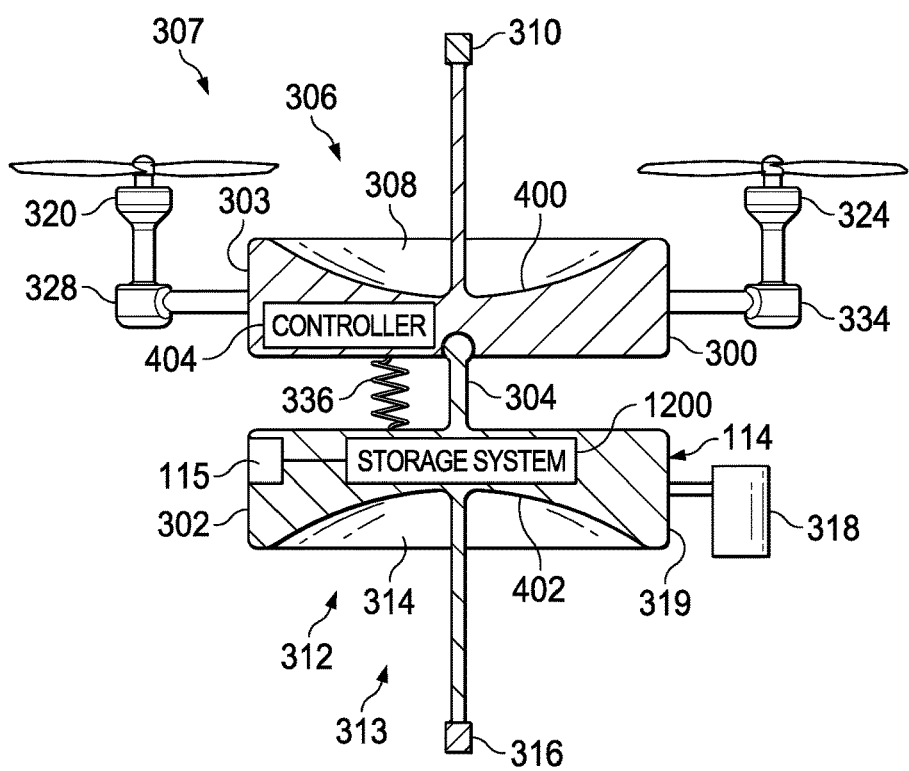
FIG. 13 is another illustration of a cross-sectional view of an unmanned aerial vehicle configured to physically transfer data in accordance with an illustrative embodiment.

In FIG. 13, another illustration of a cross-sectional view of an unmanned aerial vehicle configured to physically transfer data is depicted in accordance with an illustrative embodiment. In this illustrative example, unmanned aerial vehicle 114 is configured to perform physical data transfer.

In this illustrative example, the incoming information stored in storage system 1200 may be transmitted through a physical connection to underwater platform 102. This physical connection can be established using first physical connector 115 when unmanned aerial vehicle 114 returns to underwater platform 102 in FIGS. 1-2.

As depicted, in this illustrative example, first physical connector 115 can be a data connector, which is a physical electromechanical device that is connected to storage system 1200. This physical connection can be an electrical or optical connection that enables the transfer of information stored in storage system 1200 to underwater platform 102 in FIGS. 1-2. First physical connector 115 can be selected from one of a universal serial bus (USB) connector, a USB-C connector, an ethernet connector, a fiber-optic connector, or some other suitable type of connector for transferring information.

In other illustrative examples, information can be transferred using other mechanisms in addition to or in place of physical data connectors and laser beams. For example, radio frequency signals can be used when unmanned aerial vehicle 114 returns to or is sufficiently close to underwater platform 102. For example, radio frequency signals having a frequency of 2.0 GHz, 2.402 GHz to 2.480 GHz, and 5.0 GHz can be used. As another example, other electromagnetic signals such as infrared light or microwave signals can also be used to transmit information.

The illustration of storage system 1200 used to provide a physical transfer of information is not meant to limit the manner in which other illustrative examples can be implemented. For example, one or more storage systems can be present in addition to or in place of storage system 1200. For example, another storage system can be located in at least one of first section 300 or second section 302.

Thus, unmanned aerial vehicle 114 in the examples depicted in FIG. 12 and FIG. 13 can provide a mechanism for secure physical data transport and transmission between sources into different mediums. In an illustrative example, incoming information can be received from ground station 104 through receive radio frequency signal 200 relayed by satellite 106. The incoming information is stored in storage system 1200. The stored information can then be transported near or to underwater platform 102 where the stored information can be transmitted wirelessly to underwater platform 102 through body of water 112 or through a physical connection to underwater platform 102 in FIG. 1.

Figure 14:
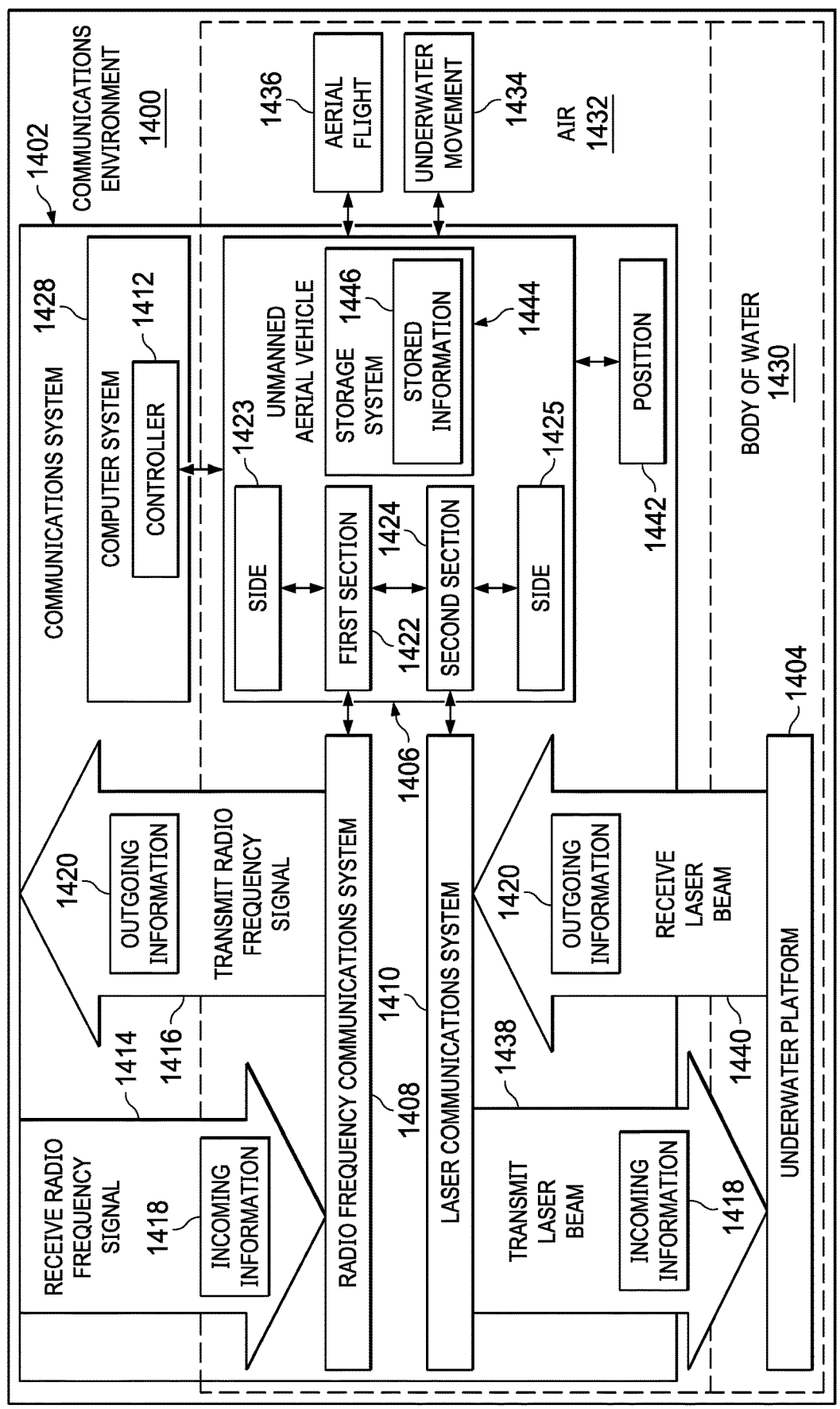
FIG. 14 is an illustration of a block diagram of a communications environment in accordance with an illustrative embodiment.

With reference next to FIG. 14, an illustration of a communications environment is depicted in accordance with an illustrative embodiment. Communications environment 1400 is an environment that enables communications with a submerged platform. Communications environment 100 and the different components in FIGS. 1-13 are examples of implementations for communications environment 1400 and associated components shown in block form. In an example, communications environment 100 is a physical implementation of communications environment 1400 of FIG. 14.

As depicted, communications system 1402 includes underwater platform 1404. Underwater platform 1404 can take a number of different forms. For example, underwater platform 1404 can be selected from a group comprising a mobile underwater platform, a stationary underwater platform, an underwater vehicle, an unmanned underwater vehicle, a remotely operated underwater vehicle, an autonomous underwater vehicle, a submarine, a submersible, an underwater habitat, and an underwater laboratory.

In this illustrative example, communications system 1402 comprises a number of different components. As depicted, communications system 1402 includes unmanned aerial vehicle 1406, radio frequency communications system 1408, laser communications system 1410, and controller 1412.

In this illustrative example, radio frequency communications system 1408, laser communications system 1410, and controller 1412 are connected to unmanned aerial vehicle 1406.

As depicted, radio frequency communications system 1408 and laser communications system 1410 are in communication with controller 1412. Laser communications system 1410 and radio frequency communications system 1408 are also in communication with each other. Laser communications system 1410 and radio frequency communications system 1408 can exchange information with each other. In this illustrative example, the communications between different components can be facilitated using a communications media such as a bus, a network, a cable, a wireless communications link, or some other type of medium.

In this illustrative example, radio frequency communications system 1408 can receive radio frequency signal 1414. Additionally, radio frequency communications system 1408 can also transmit radio frequency signal 1416. Receive radio frequency signal 1414 and transmit radio frequency signal 1416 can be selected from at least one of a high frequency radio frequency signal, a very high frequency radio frequency signal, a medium frequency radio frequency signal, an L-band frequency signal, an S-band frequency signal, a C-band frequency signal, an X-band frequency signal, a Ku-band frequency signal, a K-band frequency signal, or a Ka-band frequency signal.

In an illustrative example, incoming information 1418 can be present in receive radio frequency signal 1414. Further, outgoing information 1420 can be present in transmit radio frequency signal 1416.

As depicted, information can be placed into radio frequency signals in a number of different ways. For example, the information can be encoded into a receive radio frequency signal. The information can be encoded in an analog or digital form. For example, at least one of incoming information 1418 or outgoing information 1420 can be encoded using analog techniques such as frequency modulation, amplitude modulation, phase modulation, and other suitable techniques. At least one of incoming information 1418 or outgoing information 1420 can be encoded using digital techniques such as phase-shift keying, frequency-shift keying, amplitude-shift keying, quadrature amplitude modulation, and other suitable techniques.

As depicted, unmanned aerial vehicle 1406 comprises two sections, first section 1422 and second section 1424. First section 1422 is movably connected to second section 1424. In other words, both sections can be movable with respect to each other.

In this example, radio frequency communications system 1408 is connected to first section 1422. Laser communications system 1410 is connected to second section 1424.

In this illustrative example, controller 1412 is located in computer system 1428 for unmanned aerial vehicle 1406. As depicted, controller 1412 controls the operation of unmanned aerial vehicle 1406. Controller 1412 can be implemented in software, hardware, firmware, or a combination thereof. When software is used, the operations performed by controller 1412 can be implemented in program code configured to run on hardware, such as a processor unit. When firmware is used, the operations performed by controller 1412 can be implemented in program code and data and stored in persistent memory to run on a processor unit. When hardware is employed, the hardware can include circuits that operate to perform the operations in controller 1412.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 1428 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, an electronic flight bag, a mobile phone, or some other suitable data processing system. When more than one data processing system is present in computer system 1428, a process or component in computer system 1428 can be located in one data processing system or distributed between multiple data processing systems in computer system 1428.

In this illustrative example, all or a portion of controller 1412 in computer system 1428 can be located in unmanned aerial vehicle 1406. In some illustrative examples, a portion of controller 1412 in computer system 1428 can be located in unmanned aerial vehicle 1406 while another portion of controller 1412 in computer system 1428 can be located in another location such as a ground station, another unmanned aerial vehicle, underwater platform 1404, or some other location. When distributed, the different portions of controller 1412 in computer system 1428 can communicate using wireless communications links using mediums selected from at least one of a radio frequency signal, a laser beam, a microwave signal, or some other suitable wireless communications medium. Further, when a portion of controller 1412 in computer system 1428 is located in underwater platform 1404, a physical communications link can be used when unmanned aerial vehicle 1406 is located in or docked with underwater platform 1404.

As depicted, underwater platform 1404 is submerged in body of water 1430. Body of water 1430 can be, for example, an ocean, a lake, a sea, or some other body of water. Unmanned aerial vehicle 1406 can be deployed by underwater platform 1404. For example, unmanned aerial vehicle 1406 can be located inside of underwater platform 1404 or located on the outside of underwater platform 1404.

In this illustrative example, unmanned aerial vehicle 1406 is configured to operate while both submerged in body of water 1430 and in air 1432. In other words, unmanned aerial vehicle 1406 is configured for underwater movement 1434 and aerial flight 1436. This movement of unmanned aerial vehicle 1406 can be controlled by controller 1412.

With these capabilities of underwater and in-flight operation, unmanned aerial vehicle 1406 can also be referred to as a hybrid drone. Communications system 1402 with the hybrid drone can be a hybrid drone enabled communications system.

When unmanned aerial vehicle 1406 is deployed from underwater platform 1404, unmanned aerial vehicle 1406 can use underwater movement 1434 to move through body of water 1430. When reaching the surface of body of water 1430, unmanned aerial vehicle 1406 can shift to aerial flight 1436 and fly in air 1432. This flight can position unmanned aerial vehicle 1406 over underwater platform 1404.

In this illustrative example, controller 1412 is configured to control laser communications system 1410 to transmit incoming information 1418 in transmit laser beam 1438 to underwater platform 1404 submerged in body of water 1430. Incoming information 1418 is from receive radio frequency signal 1414 received by radio frequency communications system 1408.

Additionally, controller 1412 is configured to control radio frequency communications system 1408 to transmit outgoing information 1420 in transmit radio frequency signal 1416. In this depicted example, outgoing information 1420 is from receive laser beam 1440 received by laser communications system 1410 from underwater platform 1404.

In transmitting incoming information 1418 to underwater platform 1404, controller 1412 can be configured to control laser communications system 1410 to transmit incoming information 1418 in transmit laser beam 1438 to underwater platform 1404 submerged in body of water 1430 while unmanned aerial vehicle 1406 is in a location selected from at least one of submerged in body of water 1430 or above body of water 1430. In this example, incoming information 1418 in receive radio frequency signal 1414 is received by radio frequency communications system 1408.

Further, controller 1412 can be configured to control position 1442 of unmanned aerial vehicle 1406. For example, controller 1412 can be configured to control position 1442 of unmanned aerial vehicle 1406 such that unmanned aerial vehicle 1406 is located directly over underwater platform 1404. In this illustrative example, unmanned aerial vehicle 1406 can be in position 1442 directly over underwater platform 1404 such that transmit laser beam 1438 emitted from unmanned aerial vehicle 1406 does not have to be steered towards underwater platform 1404. In this example, the positioning of second section 1424 is such that transmit laser beam 1438 is pointed downwards and does not need to be steered at an angle to reach underwater platform 1404.

In another illustrative example, unmanned aerial vehicle 1406 can also include storage system 1444. Storage system 1444 can be located in at least one of first section 1422 or second section 1424 of unmanned aerial vehicle 1406. In this illustrative example, storage system 1444 comprises a group of storage devices. The storage devices can be, for example, selected from at least one of a hard disk drive, a flash drive, a solid-state drive, an optical drive, or some other suitable type storage device.

As depicted, storage system 1444 can store at least one of incoming information 1418 or outgoing information 1420 as stored information 1446. In one illustrative example, stored information 1446 can be transmitted to underwater platform 1404 when storage system 1444 is physically connected to underwater platform 1404.

Figure 15:
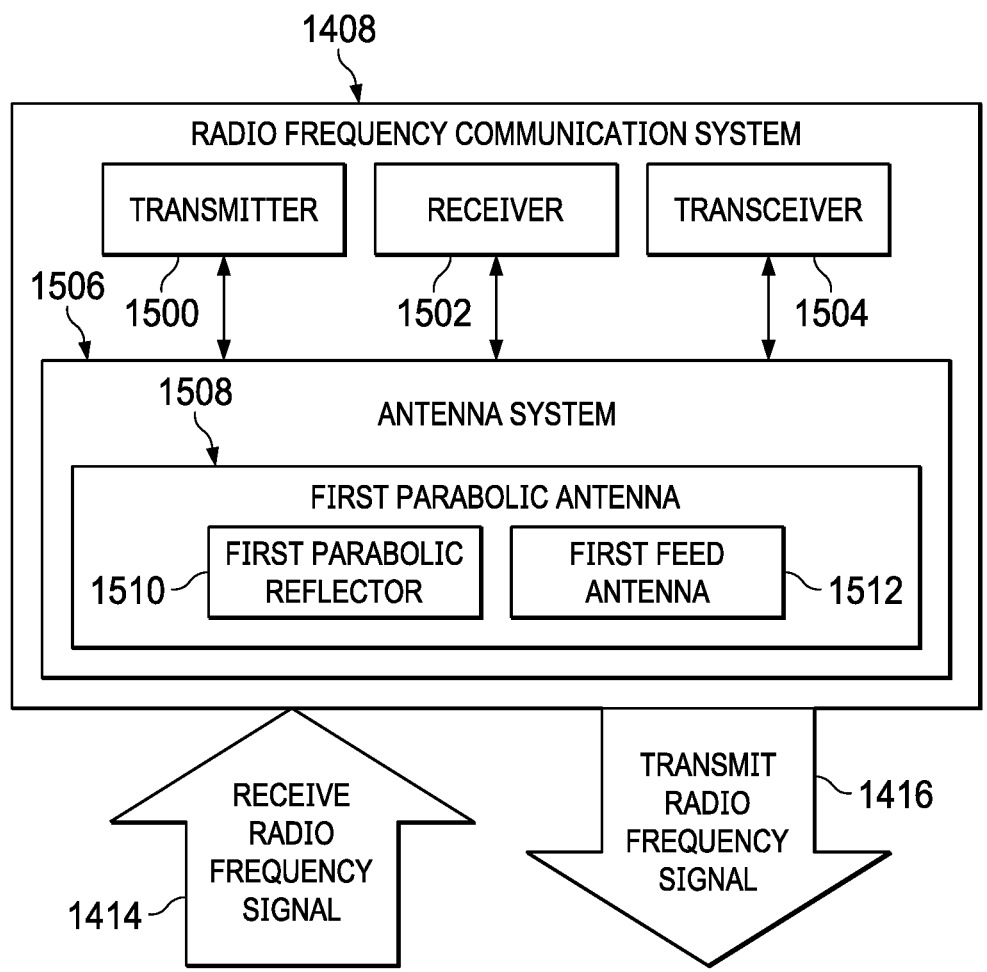
FIG. 15 is an illustration of a block diagram of a radio frequency communications system in accordance with an illustrative embodiment.

With reference now to FIG. 15, an illustration of a block diagram of a radio frequency communications system is depicted in accordance with an illustrative embodiment. An example of components that can be used to implement radio frequency communications system 1408 in FIG. 14 is shown in this figure. In an illustrative example, radio frequency communications system 307 is an example of a physical implementation of radio frequency communications system 1408.

As depicted, radio frequency communications system 1408 can include at least one of receiver 1502 or transmitter 1500. Alternatively, radio frequency communications system 1408 can include transceiver 1504 in place of receiver 1502 and transmitter 1500. Receiver 1502 and transceiver 1504 can output information in response to receiving a radio frequency signal encoded with information, such as receive radio frequency signal 1414 with incoming information 1418 in FIG. 14.

This information can be sent to laser communications system 1410 in FIG. 14 for encoding into an optical signal such as transmit laser beam 1438 in FIG. 14. Transmit laser beam 1438 can then be emitted towards underwater platform 1404 in FIG. 14.

Radio frequency communications system 1408 also includes antenna system 1506. Antenna system 1506 comprises a group of antennas. As used herein, a "group of," when used with reference to items, means one or more items. For example, a "group of antennas" is one or more antennas.

When more than one antenna is present in antenna system 1506, the antennas can be the same type or can be different types. In this illustrative example, antenna system 1506 comprises first parabolic reflector 1510 and first feed antenna 1512. One or more of these types of antennas can be present in antenna system 1506. For example, a high-frequency antenna can be present in the form of a wire connected to unmanned aerial vehicle 1406 in FIG. 14. The wire has a length that is sufficient to receive radio frequency signals such as high-frequency radio frequency signals.

Figure 16:
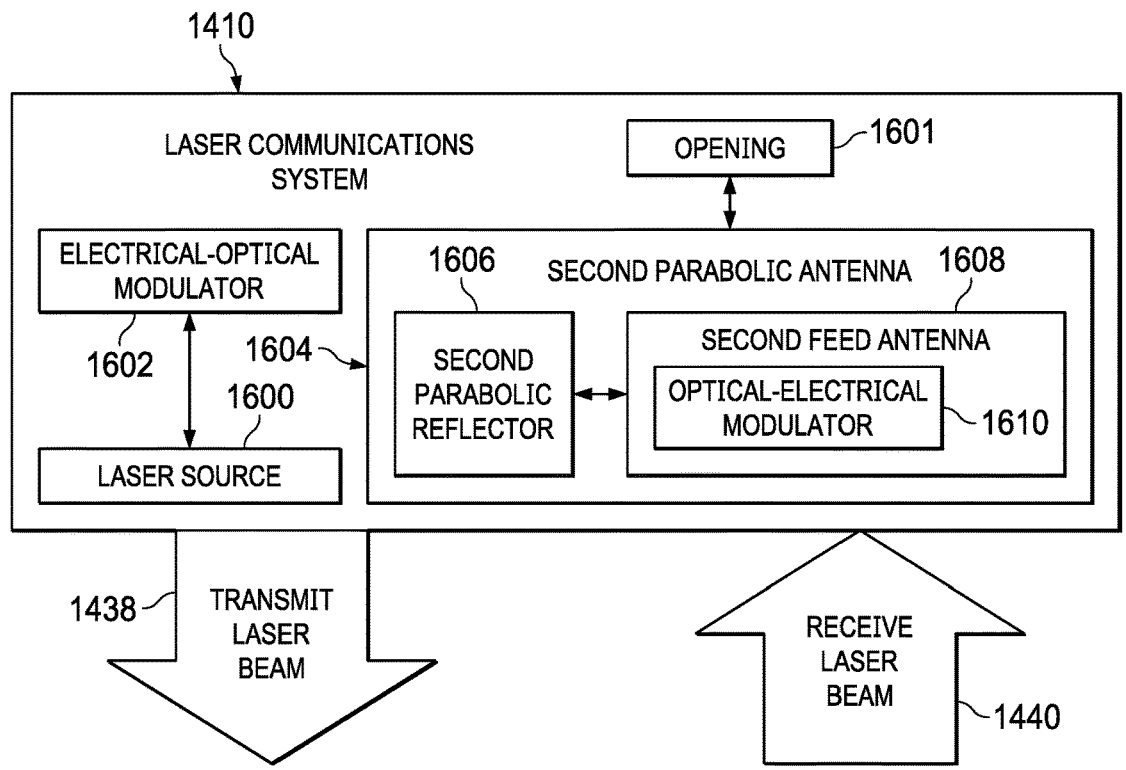
FIG. 16 is an illustration of a block diagram of an implementation of a laser communications system accordance with an illustrative embodiment.

Turning to FIG. 16, an illustration of a block diagram of an implementation of a laser communications system is depicted in accordance with an illustrative embodiment. This figure is an example of one manner in which laser communications system 1410 in FIG. 14 can be implemented. In an illustrative example, laser communications system 313 in FIG. 3 is an example of a physical implementation of laser communications system 1410. As depicted, laser communications system 1410 comprises laser source 1600, electrical-optical modulator 1602, and second parabolic antenna 1604.

In this illustrative example, laser source 1600 can generate transmit laser beam 1438. Laser source 1600 can take a number of forms. For example, laser source 1600 can include at least one of a gas laser, a chemical laser, a solid-state laser, a semiconductor laser, or some other suitable type of laser.

The wavelength of transmit laser beam 1438 can be selected to increase the distance that transmit laser beam 1438 can travel in water and, in particular, in seawater. For example, transmit laser beam 1438 can have a wavelength selected for a desired transmission within water such as body of water 112 in FIGS. 1-2. For example, wavelengths for transmit laser beam 1438 can be from about 420 nanometers to about 510 nanometers. For coastal waters, the wavelengths may be selected from between 520 nanometers to 580 nanometers.

Electrical-optical modulator 1602 is a hardware system or device. Electrical-optical modulator 1602 is configured to control laser source 1600 to encode information, such as incoming information 1418 in FIG. 14 in transmit laser beam 1438 emitted by laser source 1600.

In other examples, electrical-optical modulator 1602 can receive transmit laser beam 1438 from laser source 1600 and modulate transmit laser beam 1438 to encode incoming information 1418 in FIG. 14. In an illustrative example, electrical-optical modulator 1602 can modulate at least one of amplitude, frequency, phase, polarization, pulse width, or other characteristics of the laser beam to encode data in the laser beam.

In an illustrative example, transmit laser beam 1438 can be emitted from a number of different locations. For example, transmit laser beam 1438 can be emitted from at least one of second section 1424, side 1425 of second section 1424, opening 1601 in second parabolic antenna 1604, second feed antenna 1608, side 1423 of first section 1422, or from some other suitable location on unmanned aerial vehicle 1406.

In an illustrative example, second parabolic antenna 1604 can include a number of different components. For example, second parabolic antenna 1604 can comprise second parabolic reflector 1606 and second feed antenna 1608.

As depicted, second parabolic reflector 1606 can be used to focus receive laser beam 1440 to reduce the effects of attenuation that may occur. Second parabolic reflector 1606 can be, for example, a mirror reflector having a shape of a parabola. The shape can be selected such that coherent light reflected by second parabolic reflector 1606 has a focal point at second feed antenna 1608.

In this illustrative example, second feed antenna 1608 can include optical-electrical modulator 1610 that detects the coherent light in receive laser beam 1440. Optical-electrical modulator 1610 is a hardware system or device that detects receive laser beam 1440 and extracts outgoing information 1420 from receive laser beam 1440 received from underwater platform 1404.

Optical-electrical modulator 1610 can employ any number of known techniques or systems for extracting information from optical signals such as laser beams. For example, a photodiode can be used to convert photons in a laser beam into an electrical current. As depicted, outgoing information 1420 in the electrical current can then be encoded into transmit radio frequency signal 1416 for transmission or used for other purposes.

In this illustrative example, when laser communications system 1410 is located in second section 1424, second section 1424 can be movable such that second section 1424 hangs from first section 1422 with second parabolic antenna 1604 pointing downward during an aerial flight of unmanned aerial vehicle 1406. In an illustrative example, first section 1422 has dish shape 309 in which first parabolic antenna 1508 in radio frequency communications system 1408 can be integrated in dish shape 309. First parabolic antenna 1508 can be configured to communicate with at least one of a satellite, an aircraft, a ship, a land vehicle, or some other platform. Second section 1424 has dish shape 315 in which second parabolic antenna 1604 in laser communications system 1410 can be integrated in dish shape 315.

Figure 17:
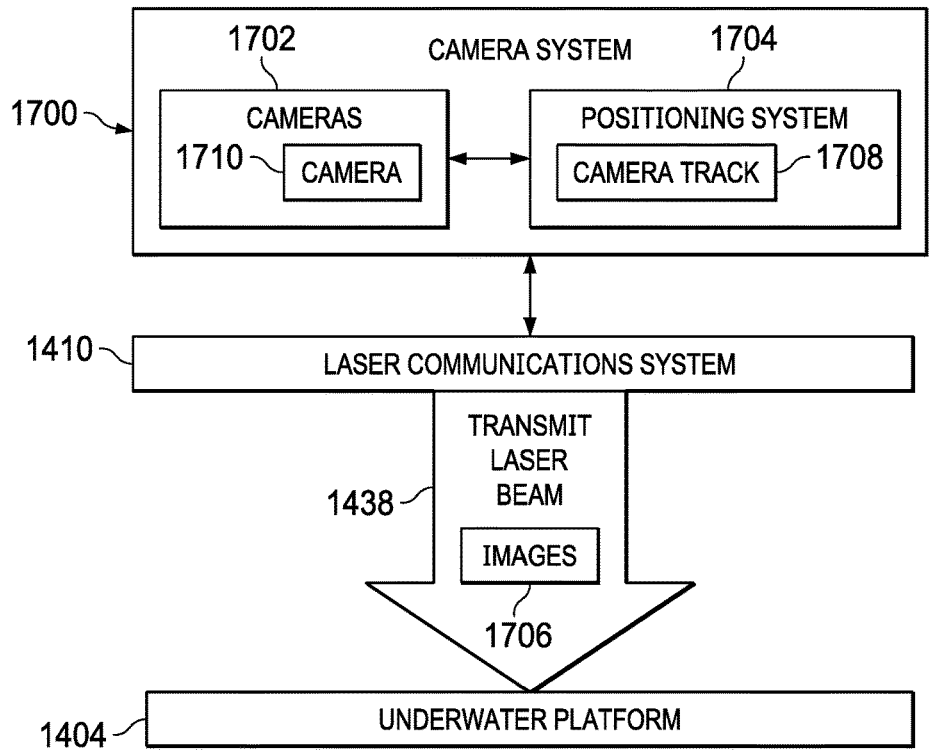
FIG. 17 is an illustration of a camera system for a periscope function in accordance with an illustrative embodiment.

With reference now to FIG. 17, an illustration of a camera system for a periscope function is depicted in accordance with an illustrative embodiment. In this illustrative example, camera system 1700 comprises a group of cameras 1702 and positioning system 1704.

As depicted, camera system 1700 can be connected to at least one of first section 1422 or second section 1424 in FIG. 14. Camera system 1700 is configured to generate images 1706. Images 1706 can be still images or form a video feed of an environment around unmanned aerial vehicle 1406 in FIG. 14. Images 1706 can be sent to underwater platform 1404 in transmit laser beam 1438 emitted by laser communications system 1410.

In this illustrative example, positioning system 1704 comprises camera track 1708. Camera track 1708 enables positioning of the group of cameras 1702. For example, camera 1710 in the group of cameras 1702 can be connected to camera track 1708. In this illustrative example, camera 1710 is movable along camera track 1708 to change the position of camera 1710. In one illustrative example, camera 1710 is rigidly attached to camera track 1708. With this example, camera track 1708 can move or rotate to move camera 1710 to different positions. In another illustrative example, camera track 1708 may be fixed while camera 1710 is movably connected to camera track 1708.

In this manner, camera system 1700 can provide a periscope function for underwater platform 1404. With camera system 1700 connected to unmanned aerial vehicle 1406 in FIG. 14, underwater platform 1404 may receive a view above body of water 1430 in FIG. 14.

The illustrations of communications environment 1400 and the different components in FIGS. 14-17 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, unmanned aerial vehicle 1406 can include one or more sections in addition to or in place of first section 1422 and second section 1424. In other illustrative examples, unmanned aerial vehicle 1406 can include more than one antenna system for at least one of radio frequency communications system 1408 or laser communications system 1410. For example, laser communications system 1410 can include a third parabolic antenna that is configured to receive or transmit laser beams between unmanned aerial vehicle 1406 and underwater platform 1404.

In yet another illustrative example, unmanned aerial vehicle 1406 can facilitate communications for another underwater platform in addition to or in place of underwater platform 1404. As another example, although not shown in this example, unmanned aerial vehicle 1406 has a propulsion system. The propulsion system can take the form of one or more rotors in the illustrative examples.

Thus, one or more illustrative examples can provide one or more technical solutions to overcome a technical problem with communicating with a submerged underwater platform. One or more illustrative examples enable sending information in a radio frequency signal with an underwater platform without the underwater platform surfacing. Further, one or more illustrative examples avoid needing to employ floating antennas or buoys.

In one illustrative example, an unmanned aerial vehicle is configured for underwater movement and aerial flight. The unmanned aerial vehicle can be deployed from the underwater platform submerged in a body of water and move through the body of water to a surface of the body of water. The unmanned vehicle can then transition into the aerial flight and receive a radio frequency signal containing incoming information. The incoming information in the radio frequency signal can be sent to the underwater platform by the unmanned aerial vehicle in one or more laser beams. Further, outgoing information can be received from the underwater platform in a laser beam. The outgoing information can then be transmitted by the unmanned aerial vehicle using the radio frequency signal. As a result, one or more issues with attenuation of radio frequency signals can be avoided through the use of the unmanned aerial vehicle establishing a communications link using the radio frequency signals and laser beams.

Further, the transmission of the incoming information to the underwater platform can be performed by the unmanned aerial vehicle while the unmanned aerial vehicle is in the air or submerged in the body of water. Depending on the depth at which the underwater platform is located, the unmanned aerial vehicle may be submerged and move closer to the underwater platform before transmitting the incoming information in a laser beam. In this manner, potential attenuation issues based on the distance between the unmanned aerial vehicle and the underwater platform can be reduced through this mode of operation. With the movement of the unmanned aerial vehicle into the body of water, the incoming information can be temporarily stored in a storage system in the unmanned aerial vehicle for later transmission when an optimal or desired distance is reached for transmitting the stored information in a laser to the underwater platform. In yet another illustrative example, the incoming information can be stored in the storage system. This incoming information can then be transmitted to the underwater platform when a physical connection is made between the unmanned aerial vehicle and the underwater platform.

Further, an illustrative example provides a periscope function to the underwater platform using the camera system in the unmanned aerial vehicle. Images generated by the camera system are transmitted to the underwater platform in a laser beam. As a result, the periscope function can be provided to the underwater platform and the underwater platform can be at greater depths than normally used with conventional periscopes.

Figure 18:
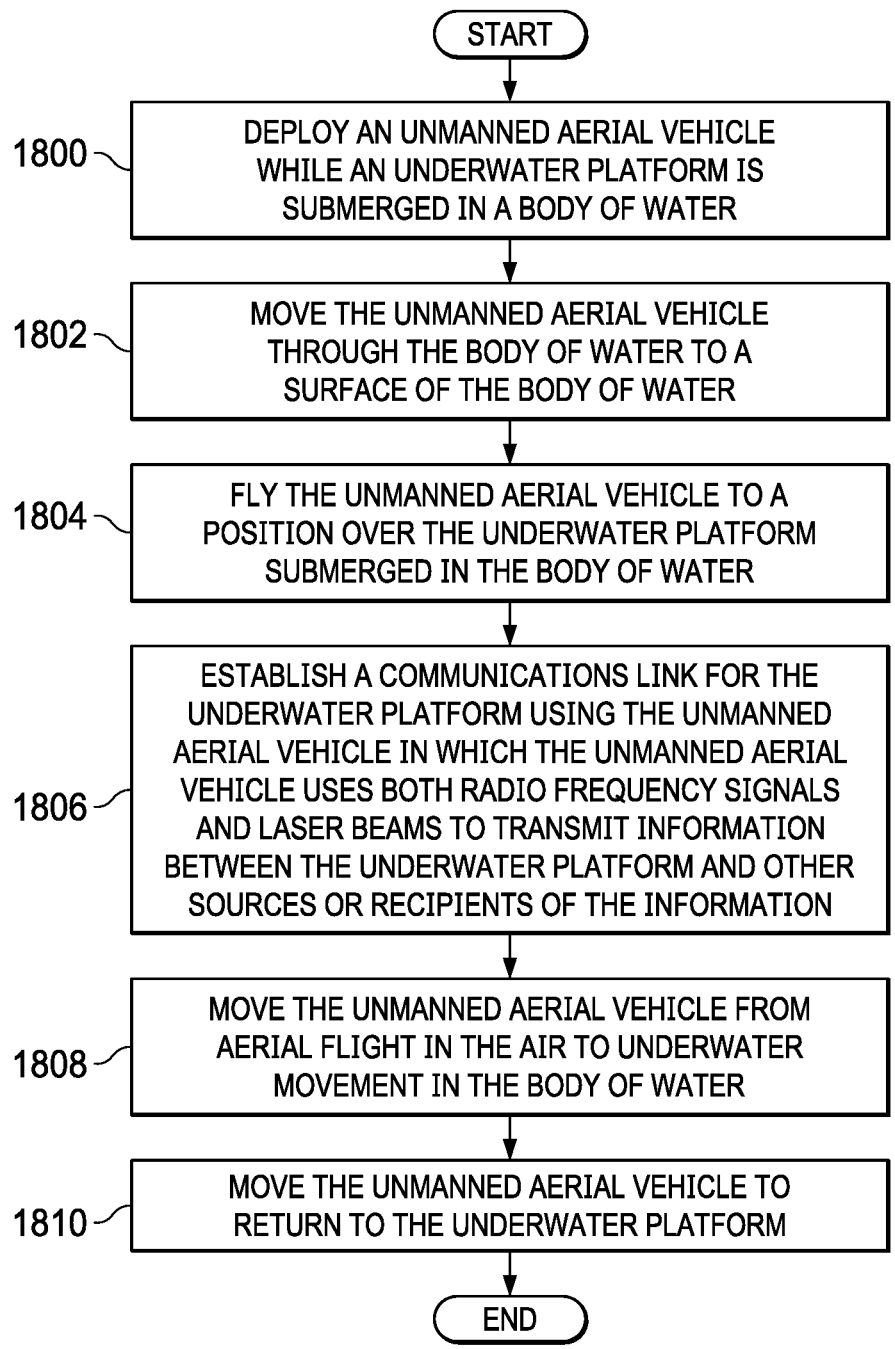
FIG. 18 is an illustration of a flowchart of a process for deploying an unmanned aerial vehicle to facilitate communications with an underwater platform in accordance with an illustrative embodiment.

Turning next to FIG. 18, an illustration of a flowchart of a process for deploying an unmanned aerial vehicle to facilitate communications with an underwater platform is depicted in accordance with an illustrative embodiment. The process illustrated in FIG. 18 can be implemented in communications environment 100 or communications environment 1400 using at least one of unmanned aerial vehicle 114 in FIG. 1-13 or unmanned aerial vehicle 1406 in FIG. 14.

The process in FIG. 18 can be implemented in hardware, software, or both. When implemented in software, the process can take the form of program code that is run by one or more processor units located in one or more hardware devices in one or more computer systems. For example, the process can be implemented in controller 404 in FIG. 4 or controller 1412 in FIG. 14.

The process begins by deploying unmanned aerial vehicle 114 while underwater platform 102 is submerged in body of water 112 (operation 1800). The process moves unmanned aerial vehicle 114 through body of water 112 to surface 110 of body of water 112 (operation 1802).

The process flies unmanned aerial vehicle 114 to a position over underwater platform 102 submerged in body of water 112 (operation 1804). Unmanned aerial vehicle 114 can be directly over underwater platform 102 such that a laser beam emitted from unmanned aerial vehicle 114 does not have to be steered towards underwater platform 102. In other illustrative examples, the position over underwater platform 102 is not directly over underwater platform 102. With this type of positioning, unmanned aerial vehicle 114 can steer the laser beam to underwater platform 102.

The process establishes a communications link for underwater platform 102 using the unmanned aerial vehicle 114 in which unmanned aerial vehicle 114 uses both radio frequency signals and laser beams to transmit information between underwater platform 102 and other sources or recipients of the information (operation 1806).

When communications are complete, the process moves unmanned aerial vehicle 114 from aerial flight in the air to underwater movement in the body of water 112 (operation 1808). The process moves unmanned aerial vehicle 114 to return to underwater platform 102 (operation 1810). The process terminates thereafter. At underwater platform 102, maintenance, recharging, data transfer, and other operations can be performed for unmanned aerial vehicle 114.

Figure 19:
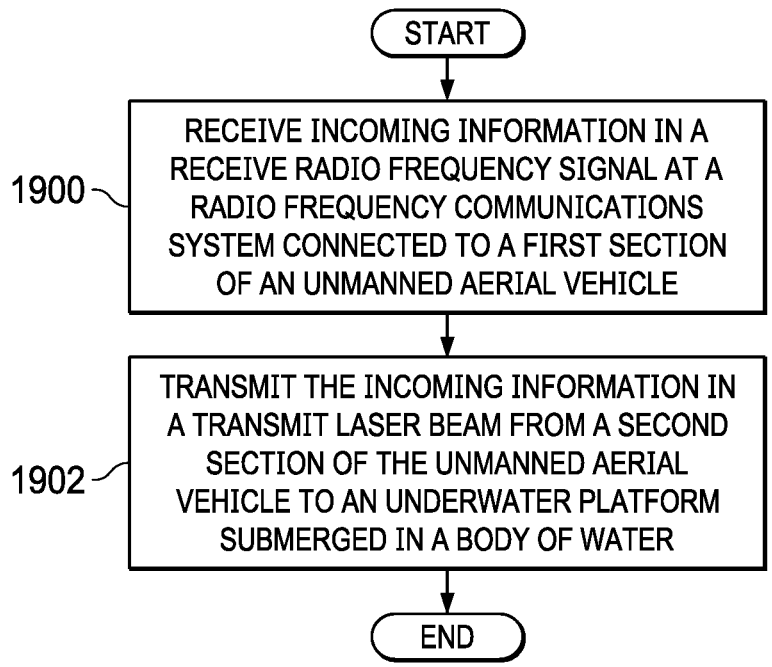
FIG. 19 is an illustration of a flowchart of a process for facilitating communications within an underwater platform in accordance with an illustrative embodiment.

Turning next to FIG. 19, an illustration of a flowchart of a process for facilitating communications within an underwater platform is depicted in accordance with an illustrative embodiment. The process illustrated in FIG. 19 can be implemented in communications environment 100 or communications environment 1400 using at least one of unmanned aerial vehicle 114 in FIGS. 1-13 or unmanned aerial vehicle 1406 in FIG. 14.

The process in FIG. 19 can be implemented in hardware, software, or both. When implemented in software, the process can take the form of program code that is run by one or more processor units located in one or more hardware devices in one or more computer systems. For example, the process can be implemented in controller 404 in FIG. 4 or controller 1412 in FIG. 14.

The process begins by receiving incoming information in receive radio frequency signal 200 at a radio frequency communications system 307 connected to a first section 300 of an unmanned aerial vehicle 114 (operation 1900). In operation 1900, the receive radio frequency signal 200 can be received by a first parabolic reflector 308 that is part of the radio frequency communications system 307.

The process transmits the incoming information in a transmit laser beam 202 from a second section 302 of the unmanned aerial vehicle 114 to an underwater platform 102 submerged in a body of water 112 (operation 1902). The process terminates thereafter. In this illustrative example, transmission of the incoming information in the transmit laser beam 202 to underwater platform 102 can be performed while unmanned aerial vehicle 114 is in a location selected from at least one of submerged in body of water 112 or above body of water 112.

Figure 20:
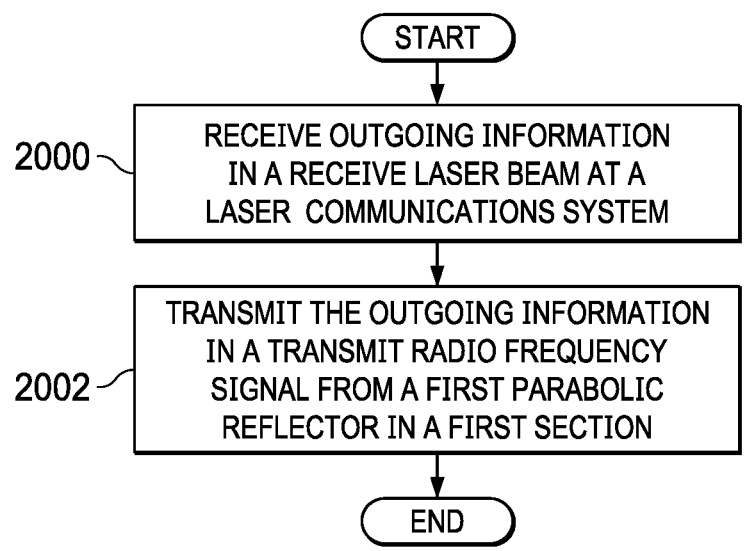
FIG. 20 is an illustration of a flowchart of a process for facilitating communications within an underwater platform in accordance with an illustrative embodiment.

Turning next to FIG. 20, an illustration of a flowchart of a process for facilitating communications within an underwater platform is depicted in accordance with an illustrative embodiment. The operations depicted in this figure are examples of additional operations that can be performed in the process for facilitating communications for underwater platform 102. In this example, a parabolic reflector in first section 300 is first parabolic reflector 308. Second section 302 has second parabolic reflector 314 configured to receive a laser beam.

The process receives outgoing information in a receive laser beam 204 at laser communications system 313 (operation 2000). In operation 2000, the receive laser beam 204 can be received by second parabolic reflector 314 in laser communications system 313 connected to the second section 302 of unmanned aerial vehicle 114. Receive laser beam 204 is received from underwater platform 102 submerged in body of water 112.

The process transmits the outgoing information in transmit radio frequency signal 206 from first parabolic reflector 308 in first section 300 (operation 2002). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 21:
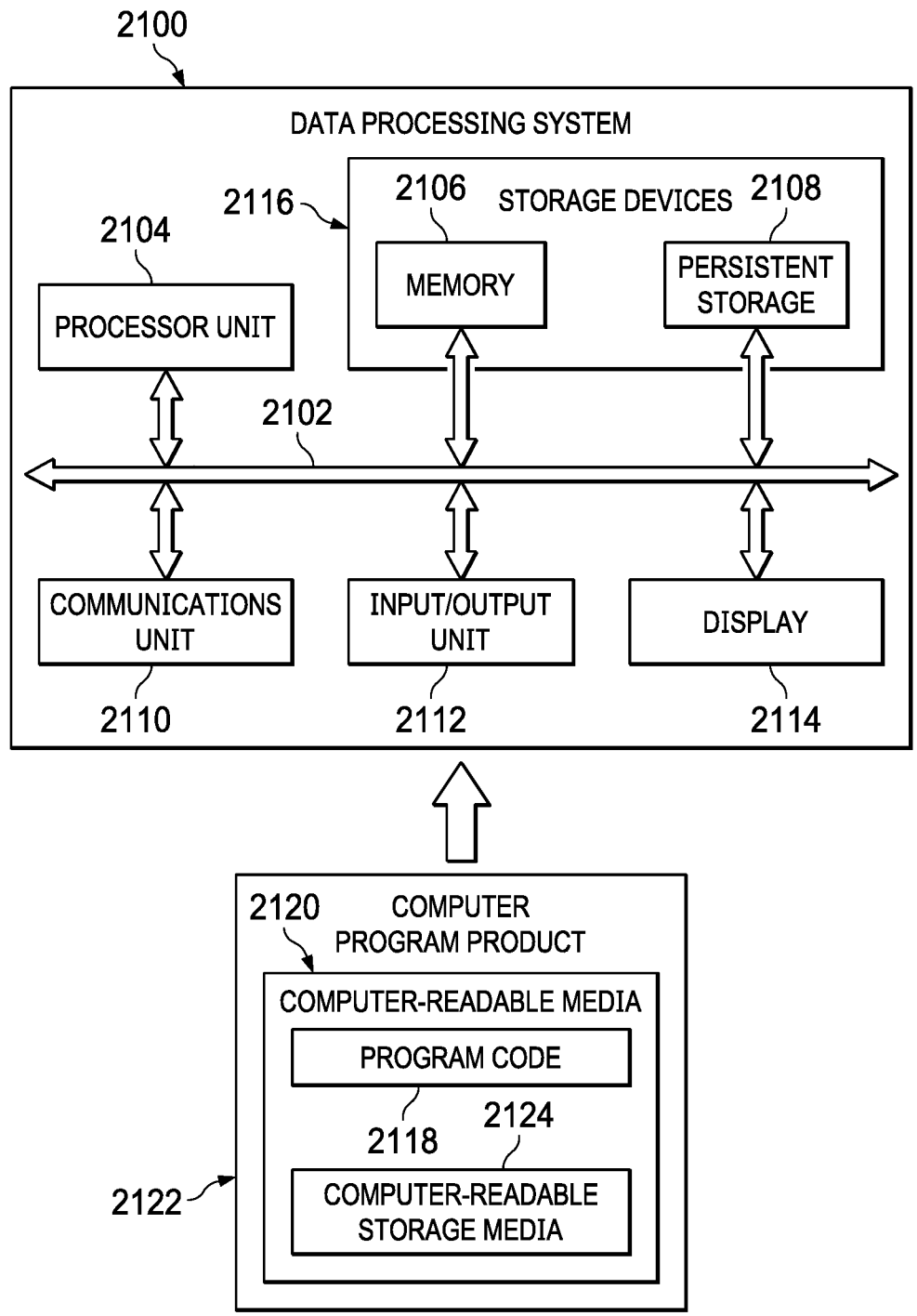
FIG. 21 is an illustration of a block diagram of a data processing system in accordance with an illustrative embodiment.

Turning now to FIG. 21, an illustration of a block diagram of a data processing system is depicted in accordance with an illustrative embodiment. Data processing system 2100 can also be used to implement controller 404 in FIG. 4 and/or computer system 1428 in FIG. 14. In this illustrative example, data processing system 2100 includes communications framework 2102, which provides communications between processor unit 2104, memory 2106, persistent storage 2108, communications unit 2110, input/output (I/O) unit 2112, and display 2114. In this example, communications framework 2102 takes the form of a bus system.

Processor unit 2104 serves to execute instructions for software that can be loaded into memory 2106. Processor unit 2104 includes one or more processors. For example, processor unit 2104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2104 can be implemented using one or more heterogeneous processor systems in which a main processor is present with secondary processors on a single chip. As another illustrative example, processor unit 2104 can be a symmetric multi-processor system containing multiple processors of the same type on a single chip.

Memory 2106 and persistent storage 2108 are examples of storage devices 2116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2116 may also be referred to as computer-readable storage devices in these illustrative examples. Memory 2106, in these examples, can be, for example, a random-access memory or any other suitable volatile or non-volatile storage device. Persistent storage 2108 can take various forms, depending on the particular implementation.

For example, persistent storage 2108 may contain one or more components or devices. For example, persistent storage 2108 can be a hard drive, a solid-state drive (SSD), a flash memory, a rewritable optical disk, a rewritable magnetic tape, or some combination of the above. The media used by persistent storage 2108 also can be removable. For example, a removable hard drive can be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that can be connected to data processing system 2100. For example, input/output unit 2112 can provide a connection for user input through at least one of a keyboard, a mouse, or some other suitable input device. Further, input/output unit 2112 can send output to a printer. Display 2114 provides a mechanism to display information to a user.

Instructions for at least one of the operating system, applications, or programs can be located in storage devices 2116, which are in communication with processor unit 2104 through communications framework 2102. The processes of the different embodiments can be performed by processor unit 2104 using computer-implemented instructions, which can be located in a memory, such as memory 2106.

These instructions are referred to as program code, computer usable program code, or computer-readable program code that can be read and executed by a processor in processor unit 2104. The program code in the different embodiments can be embodied on different physical or computer-readable storage media, such as memory 2106 or persistent storage 2108.

Program code 2118 is located in a functional form on computer-readable media 2120 that is selectively removable and can be loaded onto or transferred to data processing system 2100 for execution by processor unit 2104. Program code 2118 and computer-readable media 2120 form computer program product 2122 in these illustrative examples. In an illustrative example, computer-readable media 2120 is computer-readable storage media 2124.

In these illustrative examples, computer-readable storage media 2124 is a physical or tangible storage device used to store program code 2118 rather than a media that propagates or transmits program code 2118. Computer-readable storage media 2124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 2118 can be transferred to data processing system 2100 using a computer-readable signal media. The computer-readable signal media are signals and can be, for example, a propagated data signal containing program code 2118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2120" can be singular or plural. For example, program code 2118 can be located in computer-readable media 2120 in the form of a single storage device or system. In another example, program code 2118 can be located in computer-readable media 2120 that is distributed in multiple data processing systems. In other words, some instructions in program code 2118 can be located in one data processing system while other instructions in program code 2118 can be located in one data processing system. For example, a portion of program code 2118 can be located in computer-readable media 2120 in a server computer while another portion of program code 2118 can be located in computer-readable media 2120 located in a set of client computers.

The different components illustrated for data processing system 2100 are not meant to provide architectural limitations to the manner in which different embodiments can be implemented. In some illustrative examples, one or more of the components may be incorporated in or otherwise form a portion of, another component. For example, memory 2106, or portions thereof, can be incorporated in processor unit 2104 in some illustrative examples. The different illustrative embodiments can be implemented in a data processing system including components in addition to or in place of those illustrated for data processing system 2100. Other components shown in FIG. 21 can be varied from the illustrative examples shown. The different embodiments can be implemented using any hardware device or system capable of running program code 2118.

Some features of the illustrative examples are described in the following clauses. These clauses are examples of features not intended to limit other illustrative examples.

Clause 1: A communications system for an underwater platform, wherein the communications system comprises: an unmanned aerial vehicle comprising a first section and a second section, wherein the first section is moveably connected to the second section; a radio frequency communications system connected to the first section of the unmanned aerial vehicle, wherein the radio frequency communications system comprises a first parabolic antenna; a laser communications system connected to the second section of the unmanned aerial vehicle, wherein the laser communications system comprises a second parabolic antenna; and a controller configured to: control the laser communications system to transmit incoming information in a transmit laser beam to the underwater platform submerged in a body of water, wherein the incoming information is from a receive radio frequency signal received by the radio frequency communications system.

Clause 2: The communications system according to clause 1, wherein the controller is configured to: control the radio frequency communications system to transmit outgoing information in a transmit radio frequency signal, wherein the outgoing information is from a receive laser beam received by the laser communications system.

Clause 3: The communications system according to one of clauses 1 or 2, wherein the laser communications system emits the transmit laser beam from at least one of the second section, a side of the second section, the side of the first section, or an opening in the second parabolic antenna.

Clause 4: The communications system according to one of clauses 1, 2, or 3, wherein in controlling the laser communications system to transmit the incoming information in the transmit laser beam to the underwater platform submerged in the body of water, wherein the incoming information is from the receive radio frequency signal received by the radio frequency communications system, the controller is configured to: control the laser communications system to transmit the incoming information in the transmit laser beam to the underwater platform submerged in the body of water while the unmanned aerial vehicle is in a location selected from at least one of submerged in the body of water or above the body of water, wherein the incoming information is in the receive radio frequency signal received by the radio frequency communications system.

Clause 5: The communications system according to one of clauses 1, 2, 3, or 4, wherein the first section has a dish shape in which the first parabolic antenna in the radio frequency communications system is integrated in the dish shape of the first section and the second section has a dish shape in which the second parabolic antenna in the laser communications system is integrated in the dish shape of the second section.

Clause 6: The communications system according to one of clauses 1, 2, 3, 4, or 5, wherein the second section is movable such that the second section hangs from the first section with the second parabolic antenna pointing downward during an aerial flight of the unmanned aerial vehicle.

Clause 7: The communications system according to one of clauses 1, 2, 3, 4, 5, or 6, wherein the controller is configured to control a position of the unmanned aerial vehicle such that the unmanned aerial vehicle is located directly over the underwater platform.

Clause 8: The communications system according to one of clauses 1, 2, 3, 4, 5, 6, or 7 further comprising: a camera system connected to at least one of the first section or the second section, wherein the camera system generates images sent in the transmit laser beam to the underwater platform.

Clause 9: The communications system according to clause 8, wherein the camera system comprises: a camera connected to a camera track, wherein the camera is moveable along the camera track to change a position of the camera.

Clause 10: The communications system according to one of clauses 1, 2, 3, 4, 5, 6, 7, 8, or 9 further comprising: a storage system in the unmanned aerial vehicle, wherein the controller is configured to store the incoming information in the storage system to form stored information; and a first physical connector in the unmanned aerial vehicle, wherein the first physical connector is connected to the storage system; wherein the controller is configured to store the incoming information in the storage system to form the stored information and transmit the stored information to the underwater platform when the first physical connector is connected to a second physical connector in the underwater platform.

Clause 11: The communications system according to one of clauses 2, 3, 4, 5, 6, 7, 8, 9, or 10, wherein the receive radio frequency signal and the transmit radio frequency signal are selected from at least one of a high frequency radio frequency signal, a very high frequency radio frequency signal, a medium frequency radio frequency signal, an L-band frequency signal, an S-band frequency signal, a C-band frequency signal, an X-band frequency signal, a Ku-band frequency signal, a K-band frequency signal, or a Ka-band frequency signal.

Clause 12: The communications system according to one of clauses 1, 2, 3, 4, 5, 6, 7, 8, 9, 10, or 11, wherein the underwater platform is selected from a group comprising a mobile underwater platform, a stationary underwater platform, an underwater vehicle, an unmanned underwater vehicle, a remotely operated underwater vehicle, an autonomous underwater vehicle, a submarine, a submersible, an underwater habitat, and an underwater laboratory.

Clause 13: A communications system for an underwater platform, wherein the communications system comprises: an unmanned aerial vehicle comprising a first section having a dish shape in the first section and a second section having a dish shape in the second section, wherein the first section is moveably connected to the second section, wherein the unmanned aerial vehicle is configured for an underwater movement and an aerial flight; a radio frequency communications system connected to the first section of the unmanned aerial vehicle, wherein the radio frequency communications system comprises a first parabolic antenna with a first parabolic reflector integrated as part of the dish shape in the first section; a laser communications system connected to the second section of the unmanned aerial vehicle, wherein the laser communications system comprises a second parabolic antenna with a second parabolic reflector integrated as part of the dish shape in the second section; and a controller in the unmanned aerial vehicle, wherein the controller is configured to: control the laser communications system to transmit incoming information in a transmit laser beam to the underwater platform submerged in a body of water, wherein the incoming information is from a receive radio frequency signal received by the radio frequency communications system; and control the radio frequency communications system to transmit outgoing information in a transmit radio frequency signal, wherein the outgoing information is from a receive laser beam received by the laser communications system.

Clause 14: The communications system according to clause 13, wherein the laser communications system emits the transmit laser beam from at least one of the second section, a side of the second section, a side of the first section, or an opening in the second parabolic reflector.

Clause 15: The communications system according to one of clauses 13 or 14, wherein the controller is configured to control a position of the unmanned aerial vehicle such that the unmanned aerial vehicle maintains the position that is located directly over the underwater platform.

Clause 16: The communications system of clause 13, 14, or 15, wherein in controlling the laser communications system to transmit the incoming information in the transmit laser beam to the underwater platform submerged in the body of water, and wherein the incoming information is from the receive radio frequency signal received by the radio frequency communications system, the controller is configured to: control the laser communications system to transmit the incoming information in the transmit laser beam to the underwater platform submerged in the body of water while the unmanned aerial vehicle is in a location selected from at least one of submerged in the body of water or above the body of water, wherein the incoming information is from the receive radio frequency signal received by the radio frequency communications system.

Clause 17: The communications system according to one of clauses 13, 14, 15, or 16, wherein the second section is movable such that the second section hangs from the first section with the second parabolic reflector pointing downward during the aerial flight of the unmanned aerial vehicle.

Clause 18: The communications system according to one of clauses 13, 14, 15, 16, or 17 further comprising: a camera system connected to at least one of the first section or the second section, wherein the camera system generates images sent in the transmit laser beam to the underwater platform.

Clause 19: The communications system according to clause 18, wherein the camera system comprises: a camera connected to a camera track, wherein the camera is moveable along the camera track to change a position of the camera.

Clause 20: The communications system according to one of clauses 13, 14, 15, 16, 17, 18, or 19 of further comprising: a propulsion system connected to at least one of the first section or the second section.

Clause 21: The communications system according to one of clauses 13, 14, 15, 16, 17, 18, 19, or 20, wherein the first parabolic antenna is part of a parabolic antenna that is further configured to communicate with at least one of a satellite, an aircraft, a ship, or a land vehicle.

Clause 22: The communications system according to one of clauses 13, 14, 15, 16, 17, 18, 19, 20, or 21, wherein the receive radio frequency signal and the transmit radio frequency signal are selected from at least one of a high frequency radio frequency signal, a very high frequency radio frequency signal, a medium frequency radio frequency signal, an L-band frequency signal, an S-band frequency signal, a C-band frequency signal, an X-band frequency signal, a Ku-band frequency signal, a K-band frequency signal, or a Ka-band frequency signal.

Clause 23: The communications system according to one of clauses 13, 14, 15, 16, 17, 18, 19, 20, 21, or 22, wherein the underwater platform is selected from a group comprising a mobile underwater platform, a stationary underwater platform, an underwater vehicle, an unmanned underwater vehicle, a remotely operated underwater vehicle, an autonomous underwater vehicle, a submarine, a submersible, an underwater habitat, and an underwater laboratory.

Clause 24: A method for facilitating communications with an underwater platform, the method comprising: receiving incoming information in a receive radio frequency signal at a parabolic reflector connected to a first section of an unmanned aerial vehicle; and transmitting the incoming information in a transmit laser beam from a second section of the unmanned aerial vehicle to the underwater platform submerged in a body of water.

Clause 25: The method according to clause 24, wherein the parabolic reflector is a first parabolic reflector and further comprising: receiving outgoing information in a receive laser beam at a second parabolic reflector connected to the second section of the unmanned aerial vehicle, wherein the receive laser beam is received from the underwater platform submerged in the body of water; and transmitting the outgoing information in a transmit radio frequency signal from the first parabolic reflector in the first section.

Clause 26: The method according to one of clauses 24 or 25 further comprising: deploying the unmanned aerial vehicle from the underwater platform while the underwater platform is submerged in the body of water; and moving the unmanned aerial vehicle out of the body of water to a location over the underwater platform submerged in the body of water.

Clause 27: The method according to one of clauses 24, 25, or 26, wherein transmitting the transmit laser beam from the second section of the unmanned aerial vehicle to the underwater platform submerged in the body of water comprises: storing the incoming information in a storage system in the unmanned aerial vehicle to form stored information; submerging the unmanned aerial vehicle in the body of water after receiving the receive radio frequency signal; and transmitting the transmit laser beam from the second section of the unmanned aerial vehicle to the underwater platform submerged in the body of water while the unmanned aerial vehicle is submerged in the body of water.

Clause 28: The method according to one of clauses 24, 25, or 26, wherein transmitting the transmit laser beam from the second section of the unmanned aerial vehicle to the underwater platform submerged in the body of water comprises: transmitting the transmit laser beam from the second section of the unmanned aerial vehicle to the underwater platform submerged in the body of water while the unmanned aerial vehicle is above the body of water in an aerial flight.

Clause 29: The method according to clause 25, wherein the receive radio frequency signal and the transmit radio frequency signal are selected from at least one of a high frequency radio frequency signal, a very high frequency radio frequency signal, a medium frequency radio frequency signal, an L-band frequency signal, an S-band frequency signal, a C-band frequency signal, an X-band frequency signal, a Ku-band frequency signal, a K-band frequency signal, or a Ka-band frequency signal.

Clause 30: The method according to one of clauses 24, 25, 26, 27, 28, or 29, wherein the second section is moveable to remain pointing downward during an aerial flight of the unmanned aerial vehicle.

Clause 31: The method of according to one of clauses 24, 25, 26, 27, 28, 29, or 30, wherein the underwater platform is selected from a group comprising a mobile underwater platform, a stationary underwater platform, an underwater vehicle, an unmanned underwater vehicle, a remotely operated underwater vehicle, an autonomous underwater vehicle, a submarine, a submersible, an underwater habitat, and an underwater laboratory.

Clause B1: A communications system for an underwater platform comprising: an unmanned aerial vehicle; a laser communications system connected the unmanned aerial vehicle; a camera system connected to the unmanned aerial vehicle; and a controller in the unmanned aerial vehicle, wherein the controller is configured to: control the camera system to generate images using the camera system; and control the laser communications system to transmit the images to the underwater platform in a laser beam.

Clause B2: The communications system according to clause B1, wherein the unmanned aerial vehicle comprises a first section having a dish shape and a second section having the dish shape, wherein the first section is moveably connected to the second section, and wherein the unmanned aerial vehicle is configured for an underwater movement and an aerial flight, and the camera system is connected to at least one of the first section or the second section.

Clause B3: The communications system according to one of clauses B1 or B2, wherein a position of the camera system is controlled by at least one of rotating the unmanned aerial vehicle or tilting the unmanned aerial vehicle.

Clause B4: The communications system according to one of clauses B1, B2, or B3, wherein the camera system comprises: a camera track in the unmanned aerial vehicle, wherein the camera track is moveable; a camera in the camera system, wherein the camera is connected to the camera track; and a movement system in the unmanned aerial vehicle, wherein the movement system moves the camera track to change a position of the camera.

Clause B5: The communications system according to clause B4, wherein the camera track is moveable about a circumference of a body of the unmanned aerial vehicle and prevents movement of the camera in a direction normal to a surface of the body.

Clause B6: The communications system according to clause B4, wherein the position of the camera is controlled by at least one of rotating the unmanned aerial vehicle or tiling the unmanned aerial vehicle temporarily such that the camera slides within the camera track into the position due to gravity.

In clause B6, mass seeks lowest potential energy. In this clause, the movement system does not have a motor, but allows the camera to slide or move when the unmanned aerial vehicle is tilted.

Clause B7: The communications system according to one of clauses B1, B2, B3, B4, B5, or B6, wherein the camera system comprises: the movement system that is moveable along the camera track in the unmanned aerial vehicle; and the camera connected to a movement system, wherein the movement system is configured to move the camera along the camera track. The movement system can be a motorized wheel that moves in the camera track.

Clause B8: The communications system according to clause B7, further comprising: a track motor in the movement system that is separate from a set of unmanned aerial vehicle motors for moving the unmanned aerial vehicle.

Clause B9: The communications system according to clause B7 further comprising: a movement power source for the movement system, wherein the power source is separate from an unmanned aerial vehicle power source for the unmanned aerial vehicle and a camera power source for the camera.

Clause B10: A communications system for an underwater platform, wherein the communications system comprises: an unmanned aerial vehicle, wherein the unmanned aerial vehicle is configured for an underwater movement and an aerial flight; a radio frequency communications system connected to a first section of the unmanned aerial vehicle; a laser communications system connected to a second section of the unmanned aerial vehicle; a storage system in the unmanned aerial vehicle; a controller in the unmanned aerial vehicle, wherein the controller is configured to: control the radio frequency communications system to receive incoming information in a receive radio frequency signal while the unmanned aerial vehicle is in aerial flight; store the incoming information in a storage system to form stored information; and control the laser communications system to transmit the stored information in the storage system in a transmit laser beam to the underwater platform submerged in a body of water while the unmanned aerial vehicle is submerged in the body of water.

Clause B11: The communications system according to clause B10 further comprising: a first physical connector in the unmanned aerial vehicle; wherein the controller is configured to control the storage system to transmit the stored information when the first physical connector is connected to a second physical connector in the underwater platform.

Clause B12: The communications system according to clause B10, wherein the unmanned aerial vehicle comprises the first section having a dish shape and the second section having the dish shape, wherein the first section is moveably connected to the second section; wherein the radio frequency communications system is located in the first section and the laser communications system is located in the second section; and wherein the controller is configured to: control the laser communications system to transmit the incoming information in the transmit laser beam to the underwater platform submerged in the body of water, wherein the incoming information is from the receive radio frequency signal received by the radio frequency communications system; and control the radio frequency communications system to transmit outgoing information in a radio frequency signal, wherein the outgoing information is from a receive laser beam received by the laser communications system.

Thus, the illustrative embodiments provide a method, apparatus, and system for facilitating communications with an underwater platform. In one illustrative example, a communications system comprises an unmanned aerial vehicle, a radio frequency communications system, a laser communications system, and a controller. The unmanned aerial vehicle comprises a first section and a second section. The first section is moveably connected to the second section. The radio frequency communications system is connected to the first section of the unmanned aerial vehicle.

The radio frequency communications system includes a first parabolic antenna. The laser communications system is connected to the second section of the unmanned aerial vehicle. The laser communications system includes a second parabolic antenna. The controller is configured to control the laser communications system to transmit incoming information in a transmit laser beam to the underwater platform submerged in a body of water. The incoming information is from a receive radio frequency signal received by the radio frequency communications system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A communications system for an underwater platform, wherein the communications system comprises:
   an unmanned aerial vehicle comprising a first section and a second section, wherein the first section is moveably connected to the second section, wherein the entire unmanned aerial vehicle, including both the first section and the second section, is configured for underwater movement and configured for aerial flight;
a radio frequency communications system connected to the first section of the unmanned aerial vehicle, wherein the radio frequency communications system comprises a first parabolic antenna;
a laser communications system connected to the second section of the unmanned aerial vehicle, wherein the laser communications system comprises a second parabolic antenna; and
a controller configured to:
control the laser communications system to transmit incoming information in a transmit laser beam to the underwater platform submerged in a body of water, wherein the incoming information is from a receive radio frequency signal received by the radio frequency communications system.

2. The communications system of claim 1, wherein the controller is configured to:
control the radio frequency communications system to transmit outgoing information in a transmit radio frequency signal, wherein the outgoing information is from a receive laser beam received by the laser communications system.

3. The communications system of claim 2, wherein the receive radio frequency signal and the transmit radio frequency signal are selected from at least one of a high frequency radio frequency signal, a very high frequency radio frequency signal, a medium frequency radio frequency signal, an L-band frequency signal, an S-band frequency signal, a C-band frequency signal, an X-band frequency signal, a Ku-band frequency signal, a K-band frequency signal, or a Ka-band frequency signal.

4. The communications system of claim 1, wherein the laser communications system emits the transmit laser beam from at least one of the second section, a side of the second section, a side of the first section, or an opening in the second parabolic antenna.

5. The communications system of claim 1, wherein in controlling the laser communications system to transmit the incoming information in the transmit laser beam to the underwater platform submerged in the body of water, wherein the incoming information is from the receive radio frequency signal received by the radio frequency communications system, the controller is configured to:
control the laser communications system to transmit the incoming information in the transmit laser beam to the underwater platform submerged in the body of water while the unmanned aerial vehicle is in a location selected from at least one of submerged in the body of water or above the body of water, wherein the incoming information is in the receive radio frequency signal received by the radio frequency communications system.

6. The communications system of claim 1, wherein the first section has a dish shape in which the first parabolic antenna in the radio frequency communications system is integrated in the dish shape of the first section and the second section has a dish shape in which the second parabolic antenna in the laser communications system is integrated in the dish shape of the second section.

7. The communications system of claim 6, wherein the second section is movable such that the second section hangs from the first section with the second parabolic antenna pointing downward during an aerial flight of the unmanned aerial vehicle.

8. The communications system of claim 1, wherein the controller is configured to control a position of the unmanned aerial vehicle such that the unmanned aerial vehicle is located directly over the underwater platform.

9. The communications system of claim 1 further comprising:
a camera system connected to at least one of the first section or the second section, wherein the camera system generates images sent in the transmit laser beam to the underwater platform.

10. The communications system of claim 9, wherein the camera system comprises:
a camera connected to a camera track, wherein the camera is moveable along the camera track to change a position of the camera.

11. The communications system of claim 1, wherein the underwater platform is selected from a group comprising a mobile underwater platform, a stationary underwater platform, an underwater vehicle, an unmanned underwater vehicle, a remotely operated underwater vehicle, an autonomous underwater vehicle, a submarine, a submersible, an underwater habitat, and an underwater laboratory.

12. The communications system of claim 1 further comprising:
a storage system in the unmanned aerial vehicle, wherein the controller is configured to store the incoming information in the storage system to form stored information; and
a first physical connector in the unmanned aerial vehicle, wherein the first physical connector is connected to the storage system;
wherein the controller is configured to store the incoming information in the storage system to form the stored information and transmit the stored information to the underwater platform when the first physical connector is connected to a second physical connector in the underwater platform.

13. A communications system for an underwater platform, wherein the communications system comprises:
an unmanned aerial vehicle comprising a first section having a dish shape in the first section and a second section having a dish shape in the second section, wherein the first section is moveably connected to the second section, wherein the entire unmanned aerial vehicle, including both the first section and the second section, is configured for an underwater movement and an aerial flight;
a radio frequency communications system connected to the first section of the unmanned aerial vehicle, wherein the radio frequency communications system comprises a first parabolic antenna with a first parabolic reflector integrated as part of the dish shape in the first section;
a laser communications system connected to the second section of the unmanned aerial vehicle, wherein the laser communications system comprises a second parabolic antenna with a second parabolic reflector integrated as part of the dish shape in the second section; and
a controller in the unmanned aerial vehicle, wherein the controller is configured to:
control the laser communications system to transmit incoming information in a transmit laser beam to the underwater platform submerged in a body of water, wherein the incoming information is from a receive radio frequency signal received by the radio frequency communications system; and control the radio frequency communications system to transmit outgoing information in a transmit radio frequency signal, wherein the outgoing information is from a receive laser beam received by the laser communications system.

14. The communications system of claim 13, wherein the laser communications system emits the transmit laser beam from at least one of the second section, a side of the second section, a side of the first section, or an opening in the second parabolic reflector.

15. The communications system of claim 13, wherein the controller is configured to control a position of the unmanned aerial vehicle such that the unmanned aerial vehicle maintains the position that is located directly over the underwater platform.

16. The communications system of claim 13, wherein in controlling the laser communications system to transmit the incoming information in the transmit laser beam to the underwater platform submerged in the body of water, and wherein the incoming information is from the receive radio frequency signal received by the radio frequency communications system, the controller is configured to:
control the laser communications system to transmit the incoming information in the transmit laser beam to the underwater platform submerged in the body of water while the unmanned aerial vehicle is in a location selected from at least one of submerged in the body of water or above the body of water, wherein the incoming information is from the receive radio frequency signal received by the radio frequency communications system.

17. The communications system of claim 13, wherein the second section is movable such that the second section hangs from the first section with the second parabolic reflector pointing downward during the aerial flight of the unmanned aerial vehicle.

18. The communications system of claim 13 further comprising:
a camera system connected to at least one of the first section or the second section, wherein the camera system generates images sent in the transmit laser beam to the underwater platform.

19. The communications system of claim 18, wherein the camera system comprises:
a camera connected to a camera track, wherein the camera is moveable along the camera track to change a position of the camera.

20. The communications system of claim 13 further comprising:
a propulsion system connected to at least one of the first section or the second section.

21. The communications system of claim 13, wherein the first parabolic antenna is part of a parabolic antenna that is further configured to communicate with at least one of a satellite, an aircraft, a ship, or a land vehicle.

22. The communications system of claim 13, wherein the receive radio frequency signal and the transmit radio frequency signal are selected from at least one of a high frequency radio frequency signal, a very high frequency radio frequency signal, a medium frequency radio frequency signal, an L-band frequency signal, an S-band frequency signal, a C-band frequency signal, an X-band frequency signal, a Ku-band frequency signal, a K-band frequency signal, or a Ka-band frequency signal.

23. The communications system of claim 13, wherein the underwater platform is selected from a group comprising a mobile underwater platform, a stationary underwater platform, an underwater vehicle, an unmanned underwater vehicle, a remotely operated underwater vehicle, an autonomous underwater vehicle, a submarine, a submersible, an underwater habitat, and an underwater laboratory.

24. A method for facilitating communications with an underwater platform, the method comprising:
receiving, in an airborne unmanned aerial vehicle, incoming information in a receive radio frequency signal at a parabolic reflector connected to a first section of the unmanned aerial vehicle; and
transmitting, from the airborne unmanned aerial vehicle, the incoming information in a transmit laser beam that is transmitted from a laser unit connected to a second section of the unmanned aerial vehicle to the underwater platform submerged in a body of water.

25. The method of claim 24, wherein the parabolic reflector is a first parabolic reflector and further comprising:
receiving, in the airborne unmanned aerial vehicle, outgoing information in a receive laser beam at a second parabolic reflector connected to the second section of the unmanned aerial vehicle, wherein the receive laser beam is received from the underwater platform submerged in the body of water; and
transmitting, from the airborne unmanned aerial vehicle, the outgoing information in a transmit radio frequency signal from the first parabolic reflector in the first section.

26. The method of claim 25, wherein the receive radio frequency signal and the transmit radio frequency signal are selected from at least one of a high frequency radio frequency signal, a very high frequency radio frequency signal, a medium frequency radio frequency signal, an L-band frequency signal, an S-band frequency signal, a C-band frequency signal, an X-band frequency signal, a Ku-band frequency signal, a K-band frequency signal, or a Ka-band frequency signal.

27. The method of claim 24 further comprising:
deploying the unmanned aerial vehicle, including both the first section and the second section, from the underwater platform while the underwater platform is submerged in the body of water; and
moving the unmanned aerial vehicle, including both the first section and the second section, out of the body of water to a location over the underwater platform submerged in the body of water.

28. The method of claim 24, wherein transmitting the transmit laser beam from the second section of the unmanned aerial vehicle to the underwater platform submerged in the body of water comprises:
storing the incoming information in a storage system in the unmanned aerial vehicle to form stored information;
submerging the unmanned aerial vehicle in the body of water after receiving the receive radio frequency signal; and
transmitting the transmit laser beam from the second section of the unmanned aerial vehicle to the underwater platform submerged in the body of water while the unmanned aerial vehicle is submerged in the body of water.

29. The method of claim 24, wherein transmitting the transmit laser beam from the second section of the unmanned aerial vehicle to the underwater platform submerged in the body of water comprises:
transmitting the transmit laser beam from the second section of the unmanned aerial vehicle to the underwater platform submerged in the body of water while the unmanned aerial vehicle is above the body of water in an aerial flight.

30. The method of claim 24, wherein the second section is moveable to remain pointing downward during an aerial flight of the unmanned aerial vehicle.

31. The method of claim 24, wherein the underwater platform is selected from a group comprising a mobile underwater platform, a stationary underwater platform, an underwater vehicle, an unmanned underwater vehicle, a remotely operated underwater vehicle, an autonomous underwater vehicle, a submarine, a submersible, an underwater habitat, and an underwater laboratory.

* * * * *